United States Patent [19]

Egawa et al.

[11] Patent Number: 5,521,667
[45] Date of Patent: May 28, 1996

[54] CAMERA UTILIZING A PUSH-OUT TYPE FILM CARTRIDGE

[75] Inventors: Akira Egawa; Chikara Aoshima, both of Kawasaki, Japan

[73] Assignee: Canon Kabushiki Kaisha, Tokyo, Japan

[21] Appl. No.: 280,802

[22] Filed: Jul. 26, 1994

Related U.S. Application Data

[63] Continuation of Ser. No. 982,120, Nov. 25, 1992, abandoned, which is a continuation of Ser. No. 670,278, Mar. 15, 1991, abandoned.

[30] Foreign Application Priority Data

| Mar. 15, 1990 | [JP] | Japan | 2-62510 |
| May 28, 1990 | [JP] | Japan | 2-139041 |
| May 28, 1990 | [JP] | Japan | 2-139042 |
| Jul. 27, 1990 | [JP] | Japan | 2-200571 |

[51] Int. Cl.⁶ .................................. G03B 1/18
[52] U.S. Cl. ............................ 354/173.1; 354/214
[58] Field of Search ..................... 354/173.1, 173.11, 354/214

[56] References Cited

U.S. PATENT DOCUMENTS

| 3,874,577 | 4/1975 | Matsumoto | 226/90 |
| 4,568,166 | 2/1986 | Tateiwa | 354/214 |
| 4,728,976 | 3/1988 | Takahashi et al. | 354/173.11 |
| 4,752,795 | 6/1988 | Malloy-Desormeaux | 354/173.11 |
| 4,780,734 | 10/1988 | Ogawa et al. | 354/173.11 |
| 4,834,306 | 5/1989 | Robertson et al. | 242/71.1 |
| 4,878,075 | 10/1989 | Cannon | 354/173.1 |
| 4,885,599 | 12/1989 | Goto et al. | 354/173.11 |
| 4,980,709 | 12/1990 | Cocca | 354/173.1 |
| 5,247,321 | 9/1993 | Kazami | 354/214 X |

FOREIGN PATENT DOCUMENTS

| 55-17175 | 6/1980 | Japan. |
| 60-45231 | 3/1985 | Japan. |

*Primary Examiner*—Russell E. Adams
*Attorney, Agent, or Firm*—Fitzpatrick, Cella, Harper & Scinto

[57] ABSTRACT

A camera utilizes a push-out type film cartridge which is so constructed that the revolution of a feed spool equipped therein feeds out the film. The camera comprises a film feeding means capable of blank feeding the film by driving said feed spool, and a control means capable of having said film feed means rewinding the film and blank feeding the film again in case the blank feeding of said film feeding means failed.

58 Claims, 25 Drawing Sheets

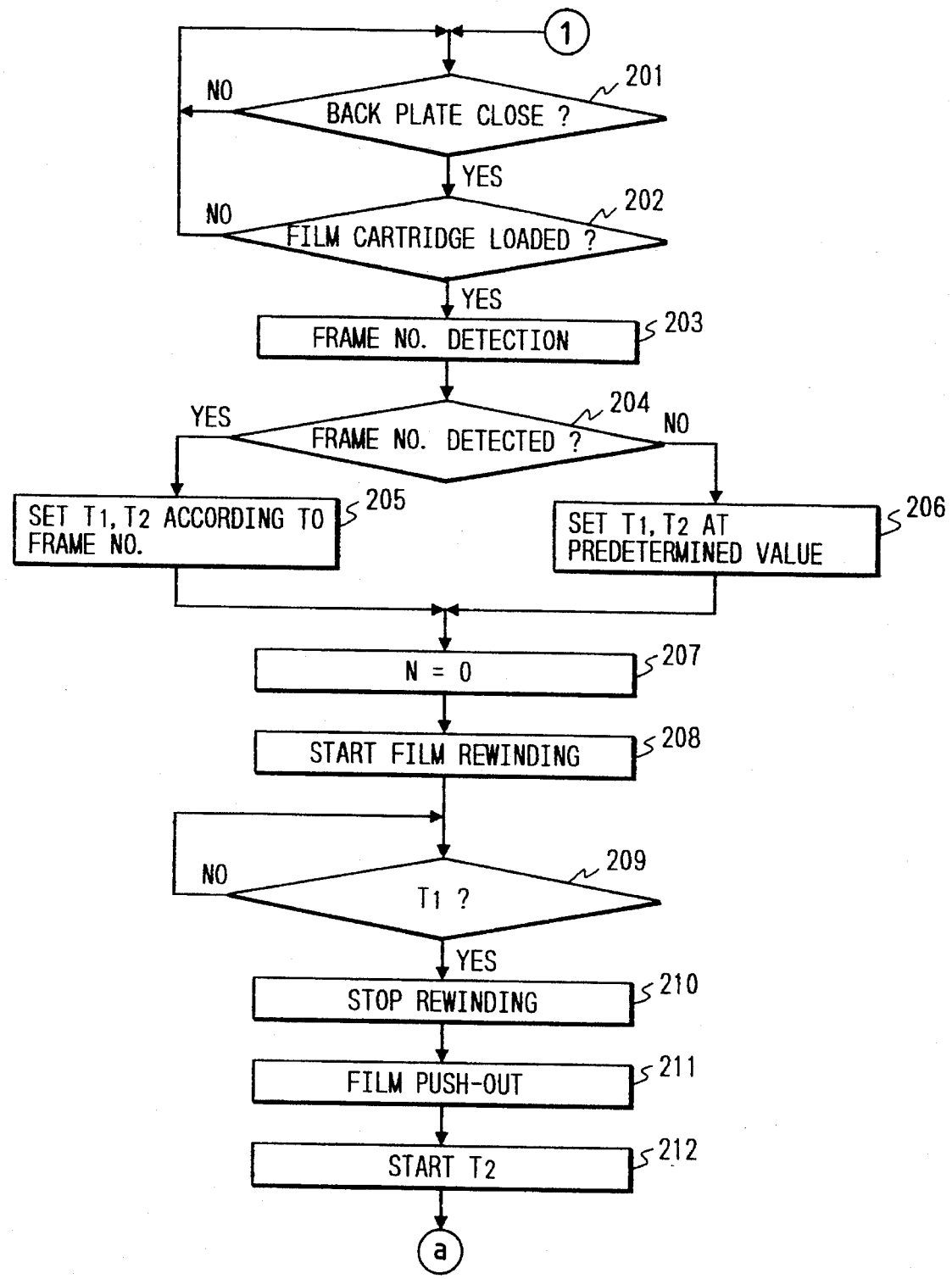

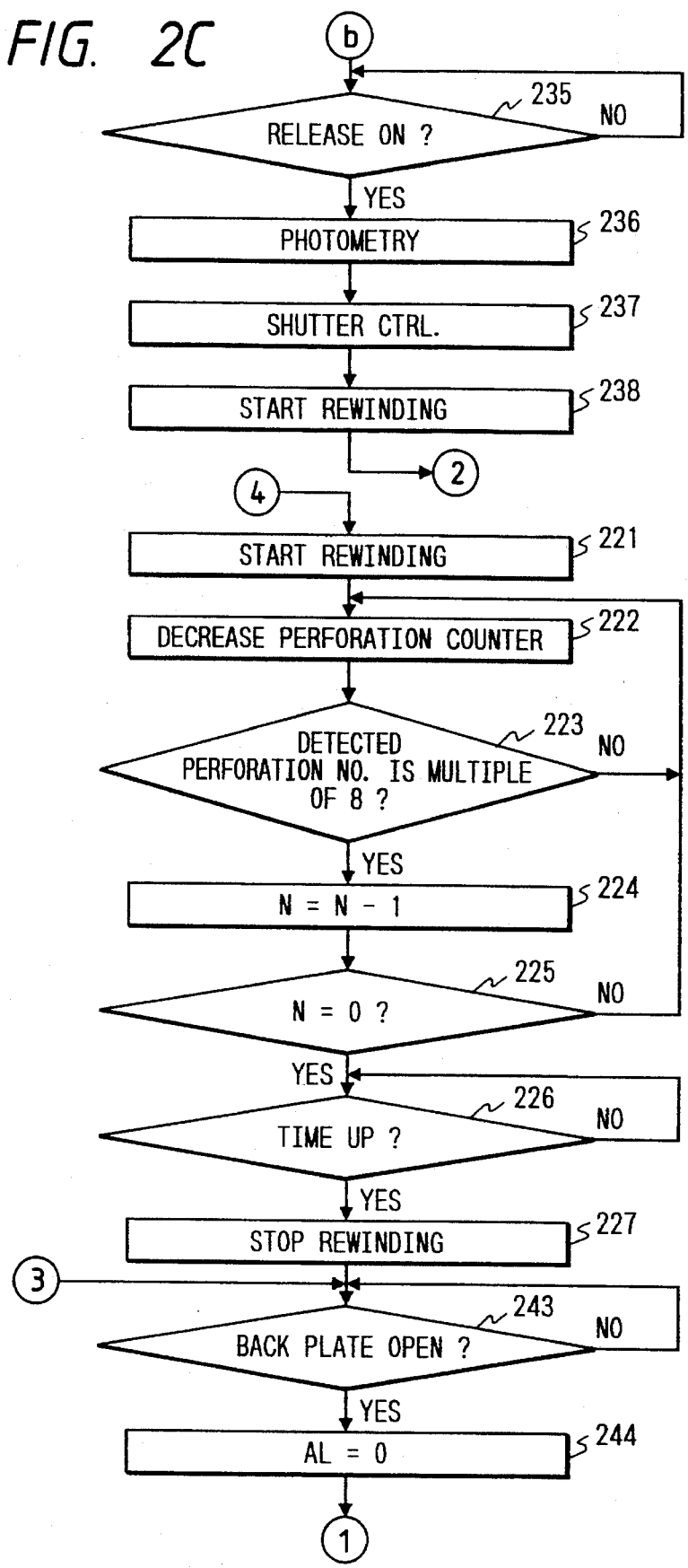

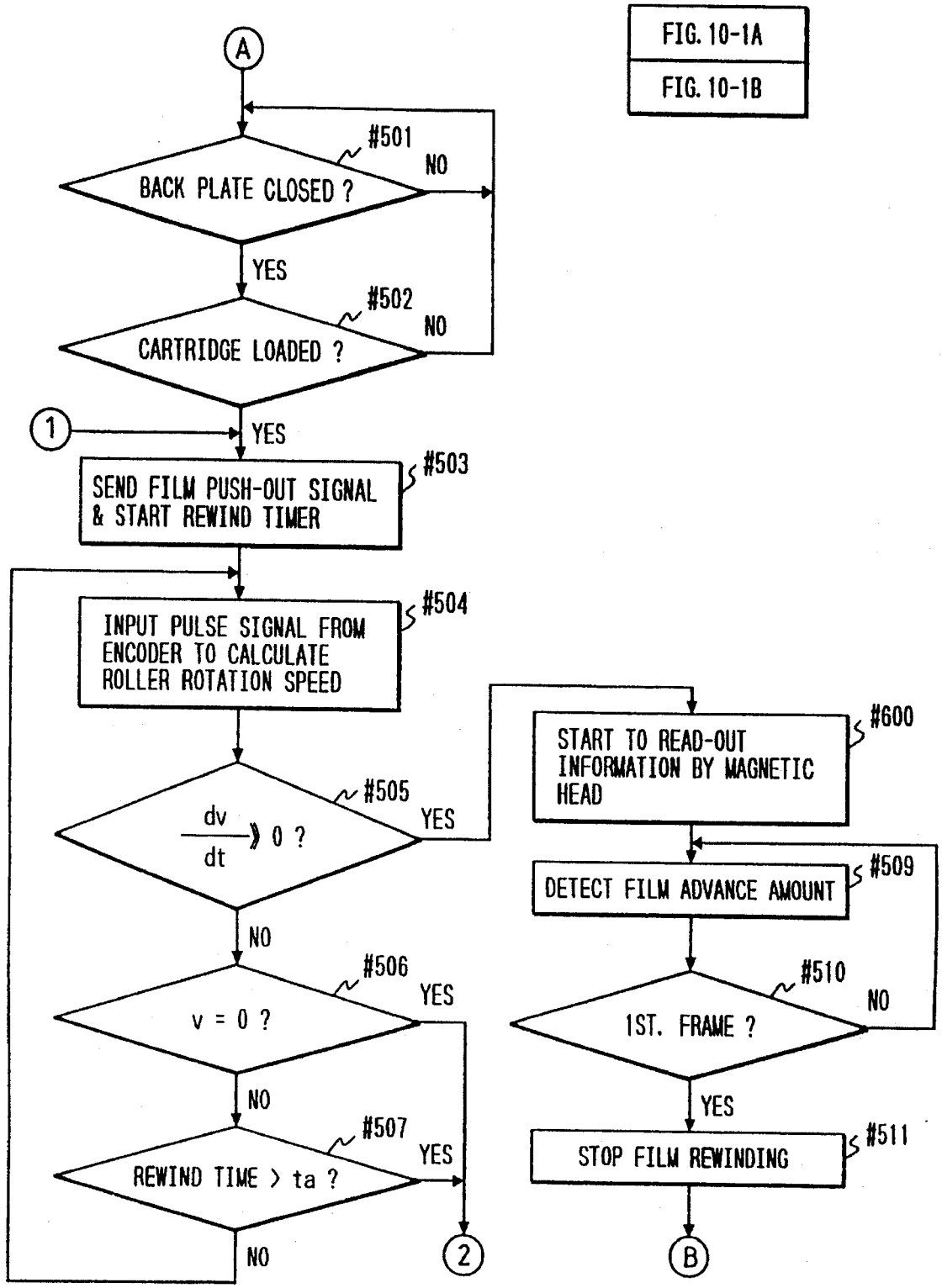

| FIG. 10-2A |
| FIG. 10-2B |

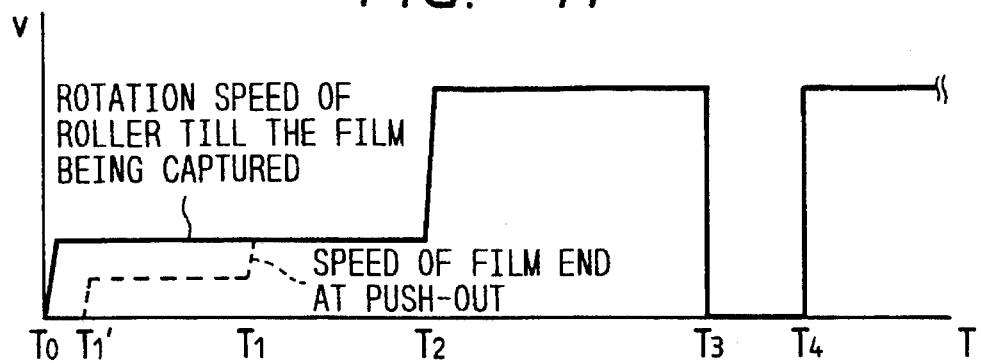
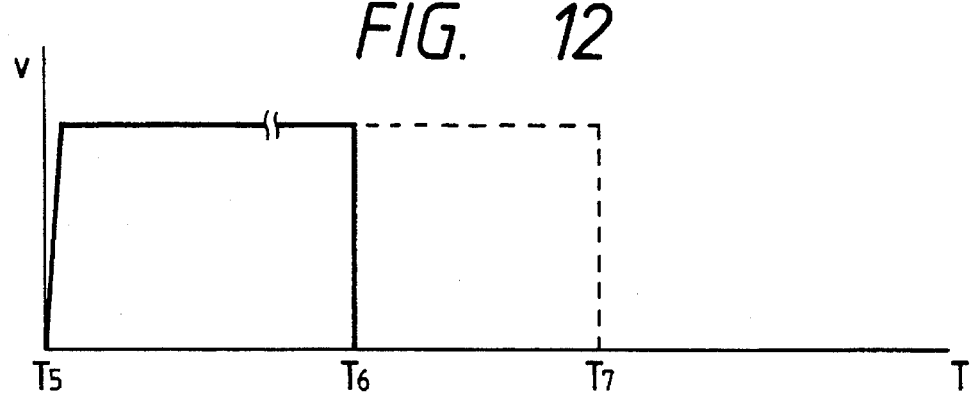
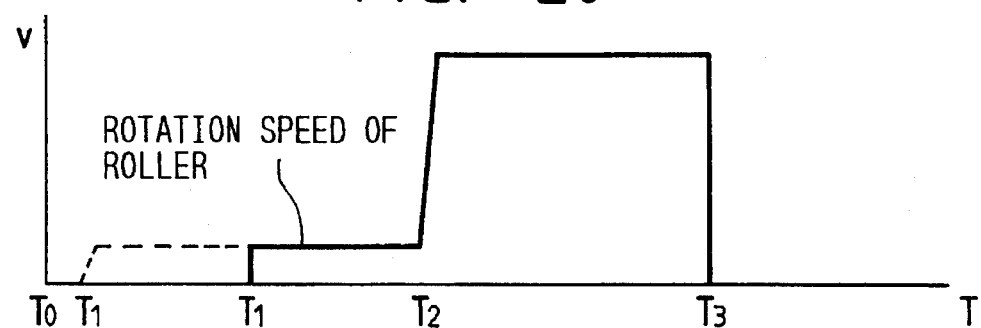

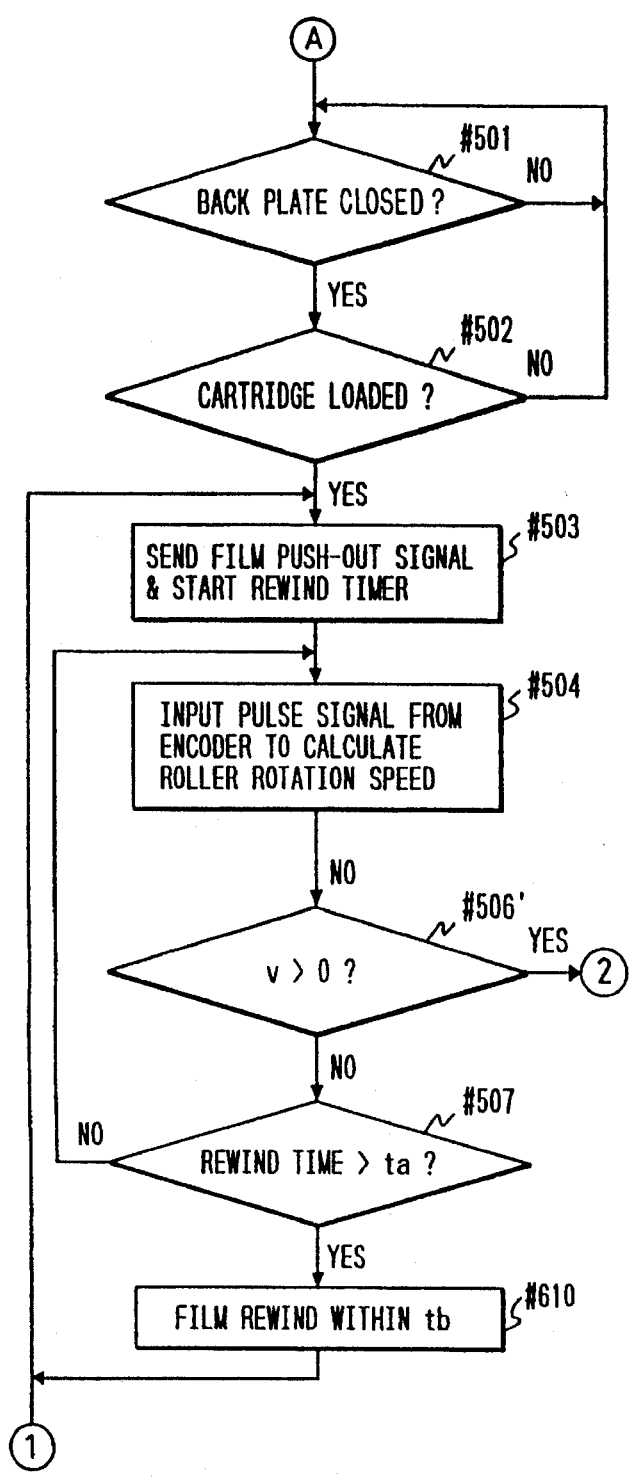
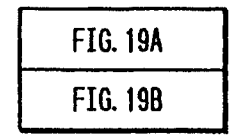
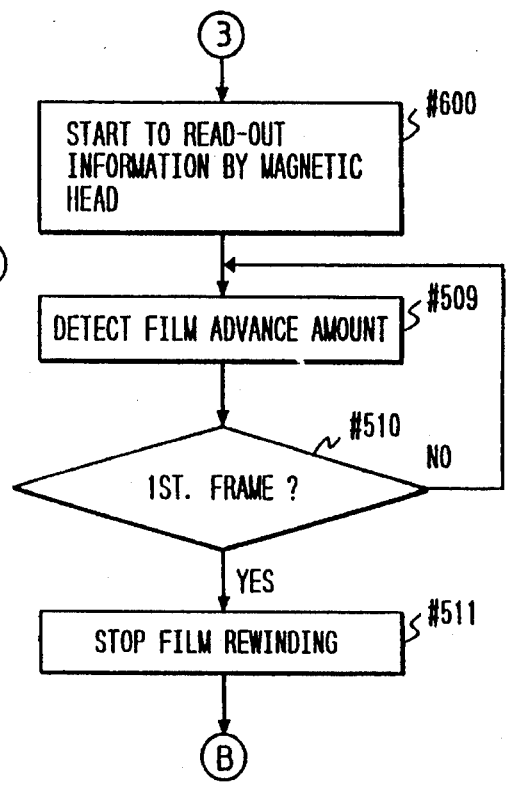

CAMERA UTILIZING A PUSH-OUT TYPE FILM CARTRIDGE

This application is a continuation of prior application Ser. No. 07/982,120 filed on Nov. 25, 1992, which is a continuation of application Ser. No. 07/670,278 filed on Mar. 15, 1991, both now abandoned.

BACKGROUND OF THE INVENTION

1. Field of the Invention

This invention relates to a camera utilizing a push-out type film cartridge which is so constructed that the film being wholly stored in a film cartridge is pushed out from the outlet of said film cartridge by means of a transition of the driving force to a feed spool equipped inside said film cartridge.

2. Related Background Art

So far a camera capable of blank feeding the film (automatically by means of a motor) to the first frame automatically or through a manipulation upon the loading of the film is known.

Said blank feeding, however, often failed, and in that case, the camera user anxiously had to open the back plate and re-load the film.

SUMMARY OF THE INVENTION

This invention, taking the above mentioned inconvenience into consideration, is intended to provide a camera which utilizes a push-out type film cartridge that is so constructed that the revolution of a feed spool equipped therein feeds out the film. The camera has a film feeding means capable of blank feeding the film by driving said feed spool, and also has a control means capable of rewinding and repeating blank feeding in case the blank feeding by said film feeding means failed, so that the blank feeding can be automatically tried again in case of a blank feeding failure.

One aspect of this invention is to provide a camera having an alarm means to signal a blank feeding failure of such camera as mentioned. Said control means repeats rewinding and blank feeding at specified times after the said blank feeding failure and then if the said blank feeding fails again, said alarm means signals the failure of blank feeding for the first time to prevent useless repeating of said blank feeding.

Another aspect of this invention is to provide a camera utilizing a push-out type film cartridge which is so constructed that the revolution of a feed spool equipped therein feeds out the film. The camera has the feeding means to feed the film by driving said feed spool and has the control means which firstly makes said film cartridge rewind by said feeding means and then do the blank feeding to feed out the film from said film cartridge. Rewinding the film prior to the start of the blank feeding can prevent accidents of film bending or sticking due to dust or sticky matters inside the film cartridge.

Another aspect of this invention is to provide a camera having a time setting means to set a time duration to judge whether said blank feeding has been properly done or not depending on the number of the frames of the film being loaded into such a camera as mentioned, or a time duration to rewind said film, so that the judgment of said blank feeding status or the rewinding of said film can be always done quickly.

Another aspect of this invention is to provide a camera having an adjusting means that, in case of a failure of said blank feeding, varies the rewinding position of the film in accordance with the feeding position of the film fed by said blank feeding. The second pushing-out of the film leader is eliminated if the film leader has been successfully pushed out from the cartridge even in case of a blank feeding failure, so it can prevent that repeating this action and spending worthless time.

Other aspect of this invention are made clear by the following embodiments.

BRIEF DESCRIPTION OF THE DRAWINGS

FIGS. 10-1 and 10-2 are flow charts showing the functions of the camera.

FIG. 11 shows the speeds of the film end and roller member at the time of automatic loading.

FIG. 12 shows the speeds of the film end and roller member at the time of film rewinding.

FIG. 10-1 is partly modified.

FIG. 20 shows the speeds of the film end and roller member at the time of automatic loading.

DETAILED DESCRIPTION OF THE PREFERRED EMBODIMENTS

Figure 1:
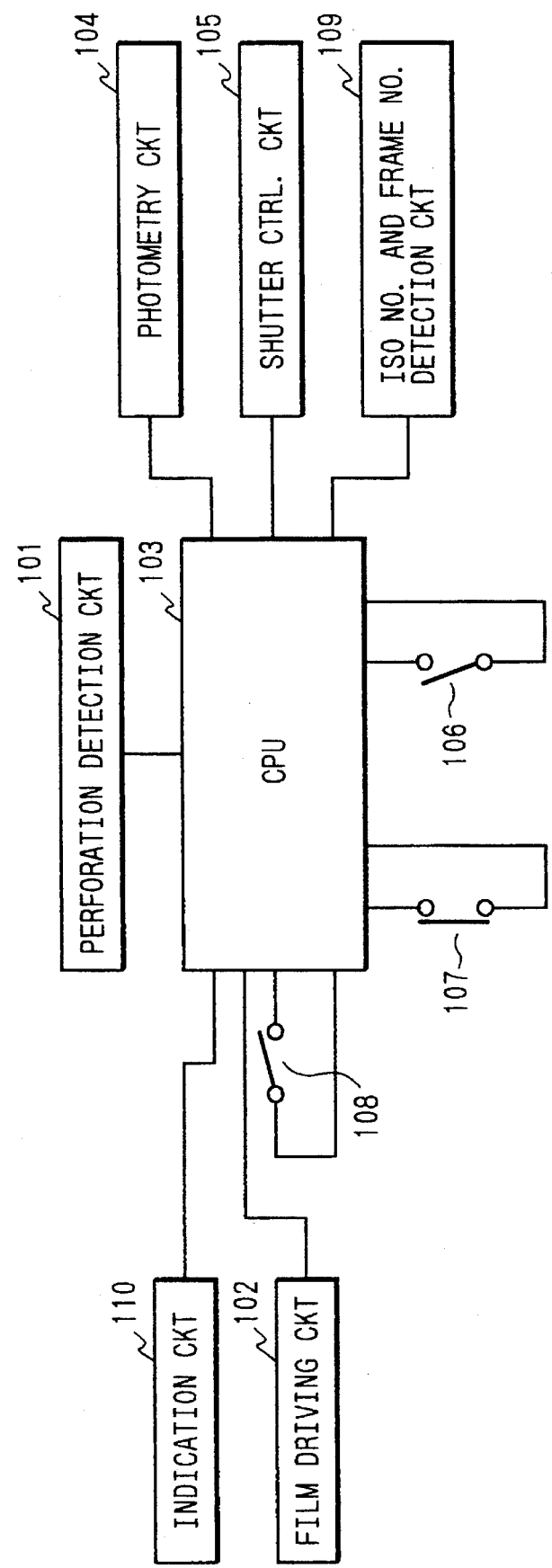
FIG. 1 is a camera circuit diagram of one of the embodiments of the present invention.
Figure 2B:
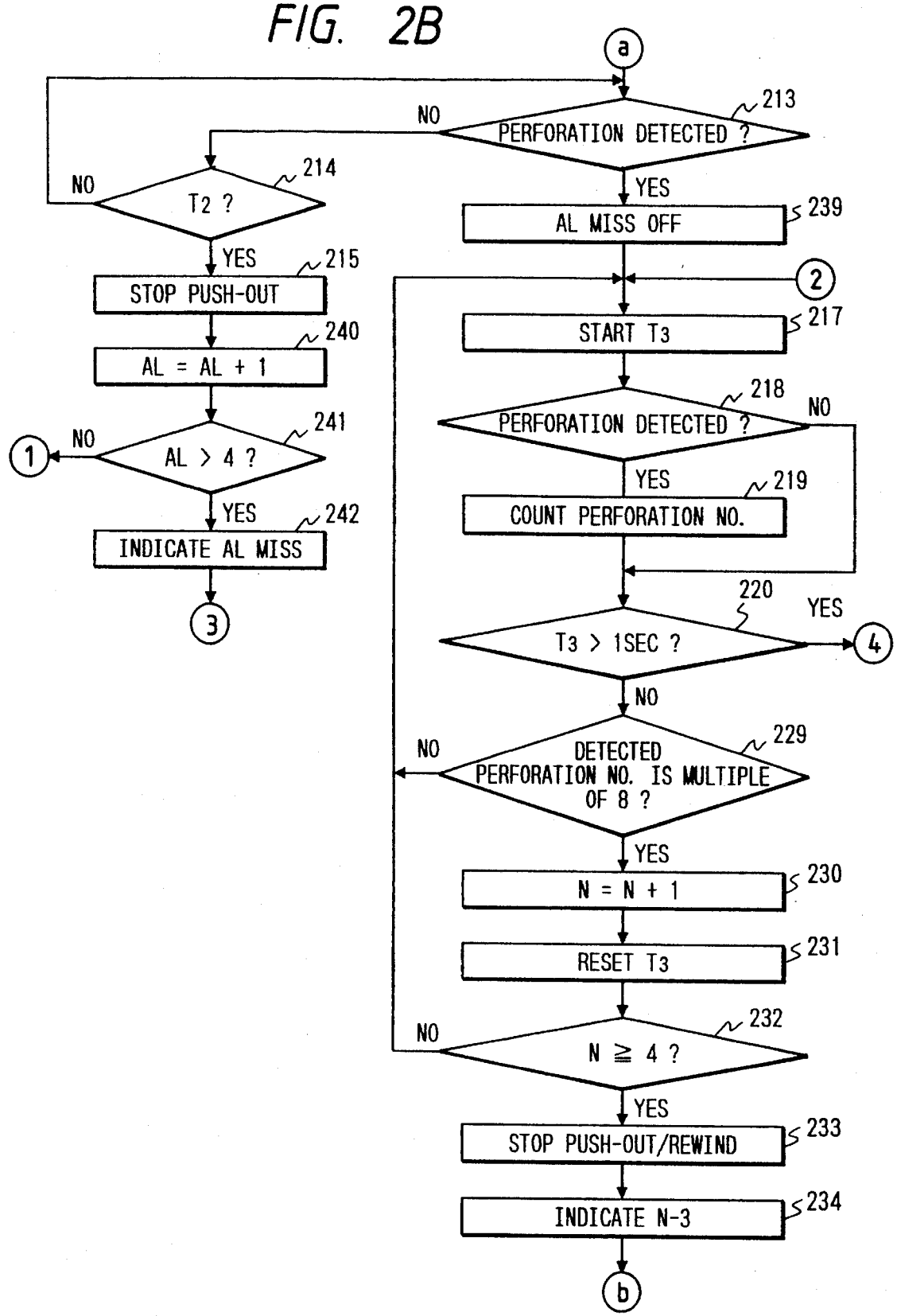
FIG. 2 is a flow chart showing the functions of the above circuit of FIG. 1.

The present invention will hereinafter be described in greater detail with respect to an embodiment thereof shown in the drawings.

Figure 6:
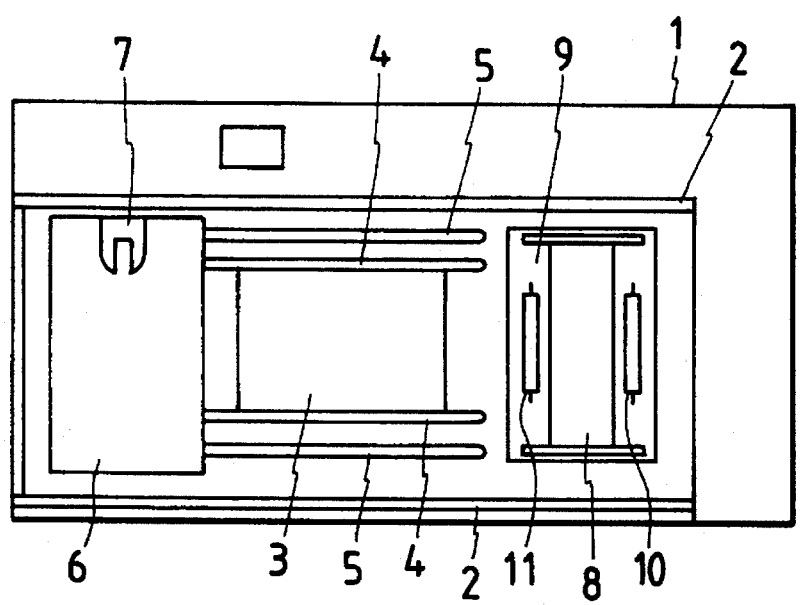
FIG. 6 is a back view of the camera corresponding to the circuit diagram of FIG. 1.

FIG. 6 shows a back view of an embodiment of the camera of the present invention where the back plate is omitted for explanatory conveniences. In said figure, 1 is a camera main body, 2 is a groove to mate with the back plate, and 3 is an opening portion where an aperture is located. 4 are inside rails for film guiding and 5 are outside rails for film guiding, the inside rails 4 being used to determine the film position in the front-back direction (light axis direction) and the outside rails 5 being used to determine the film position in the up-down direction. 6 is a cartridge chamber, which accommodates a push-out type film cartridge to be mentioned hereinafter. 7 is a fork as a spool engagement member which engages with a feed spool located inside the film cartridge and is driven by a film feeding mechanism of the camera to be mentioned hereinafter. 8 is a winding spool located in the spool chamber 9 and is so constructed that the film tip is automatically wound by rollers 10 and 11 utilizing such a known means as that indicated in Japanese Laid-Open Patent Application No. 60-45231.

Figure 3:
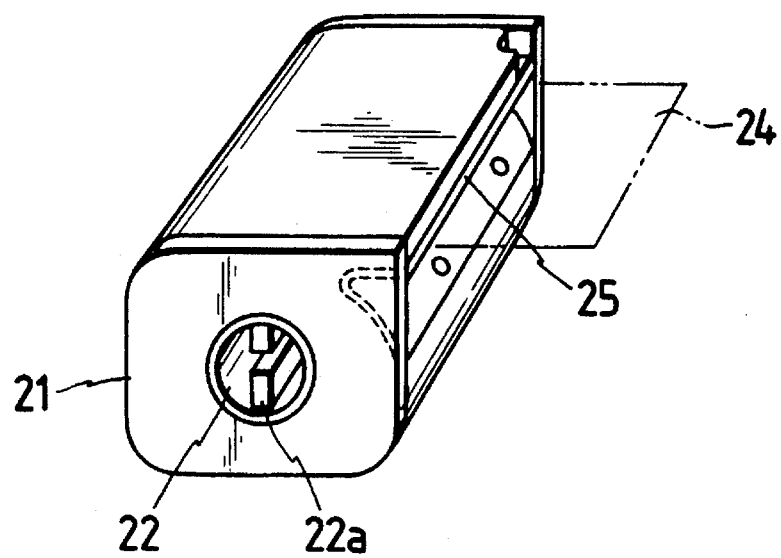
FIG. 3 is a side view showing the film cartridge relating to the present invention.
Figure 4:
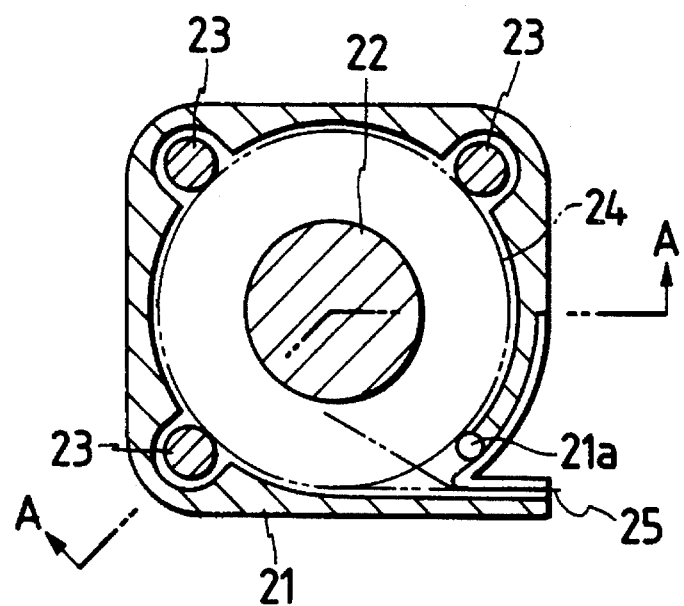
FIG. 4 is a horizontal cross-sectional view of the above film cartridge.
Figure 5:
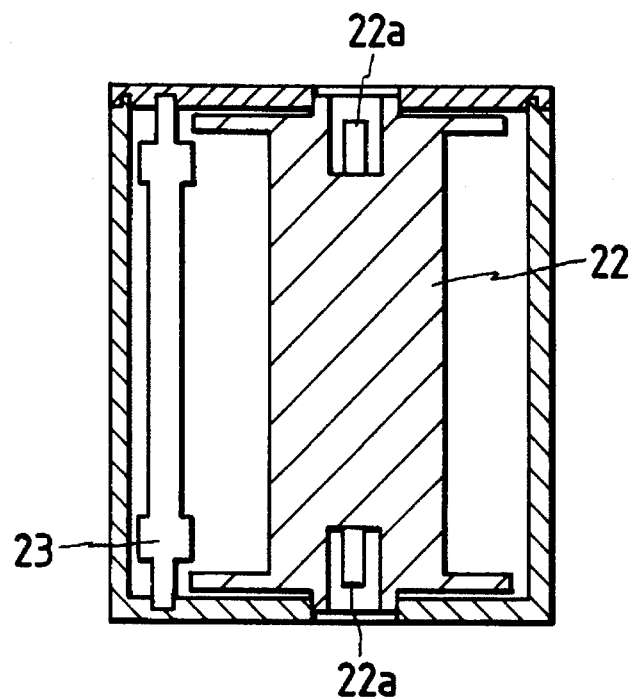
FIG. 5 is a cross-sectional view taken along line A—A of FIG. 4.

FIGS. 3 through 5 show an embodiment of a push-out type film cartridge to be used in the embodiment of the camera of the present invention, FIG. 3 being a side view thereof, FIG. 4 being a horizontal cross-sectional view thereof and FIG. 5 a cross-sectional view taken along line A—A of FIG. 4.

In FIGS. 3 through 5, 21 is a chassis of the cartridge, in which the feed spool 22 is axially supported for revolution. Also, said feed spool 22 has an engagement portions 22a at both ends which engage with said fork 7. 23 are rollers, which are axially supported in the chassis 21. The embodiment hereof is so constructed that three rollers 23 and the internally protruded portion 21a of the chassis 21 get in touch with the axially outermost side of the film wound on the feed spool 22. Consequently, when the feed spool 22 is turned in the film pushing-out direction (counterclockwise in FIG. 4), the film 24 will be unwound and pushed out from the opening 25. At that time, the rollers 23 and the internally protruded portion 21a of the chassis 21 get in touch with the axially outermost side of the film 24 where the rollers 23 turn due to rotational friction, enormously reducing the frictional force between the rollers and the film. As a result, the tip of the film is pushed out smoothly from the opening 25 without being bent unless the tip gets stuck with dust or sticky matters residing in the chassis 21. When the film 24 is rewound, by turning the feed spool 22 in the film rewinding direction (clockwise in FIG. 4), the; film 24 is returned and rewound on the feed spool 22.

Figure 7:
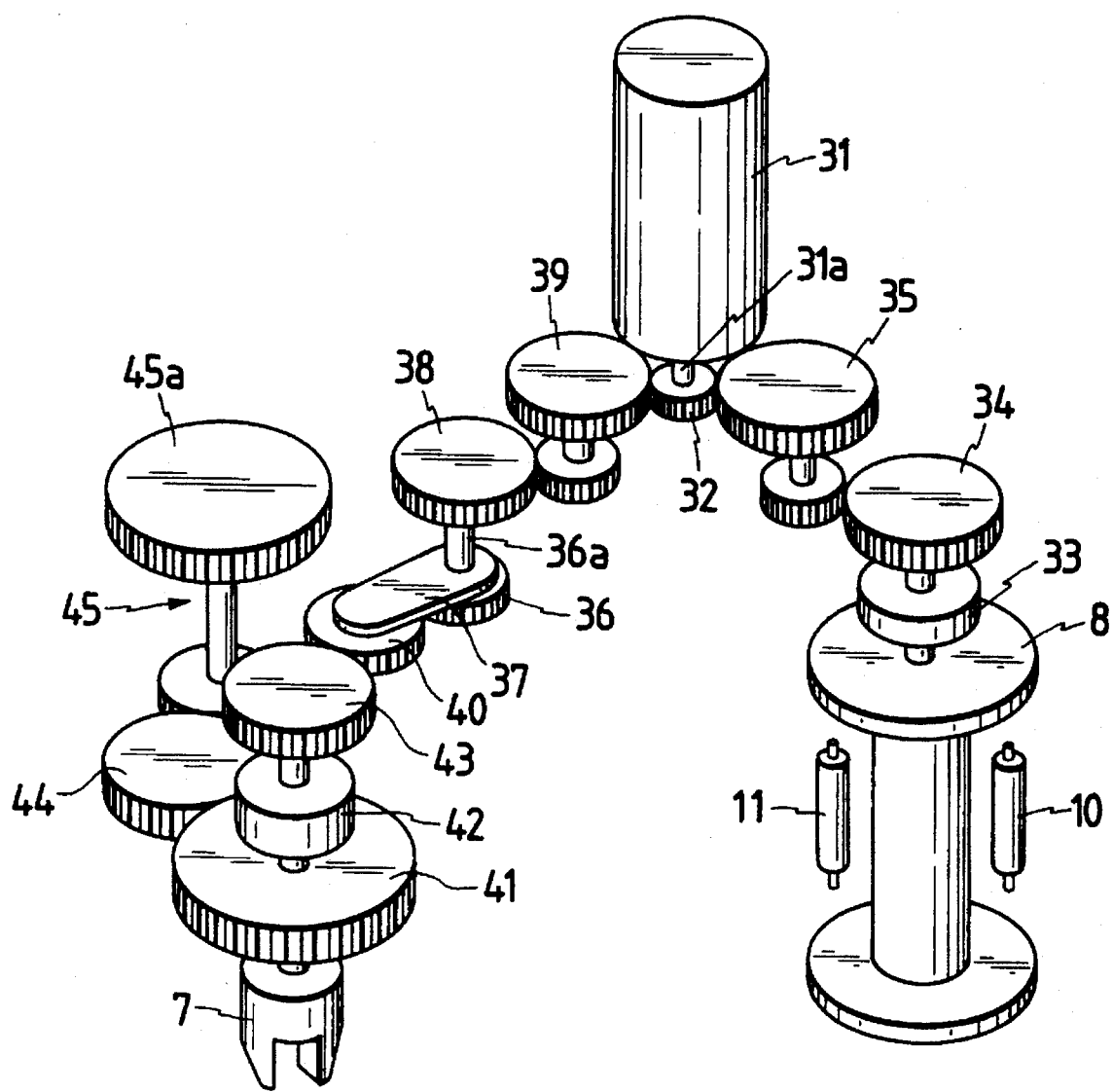
FIGS. 7 and 8 are side views of the film feeding mechanism of the camera corresponding to the circuit diagram of FIG. 1.
Figure 8:
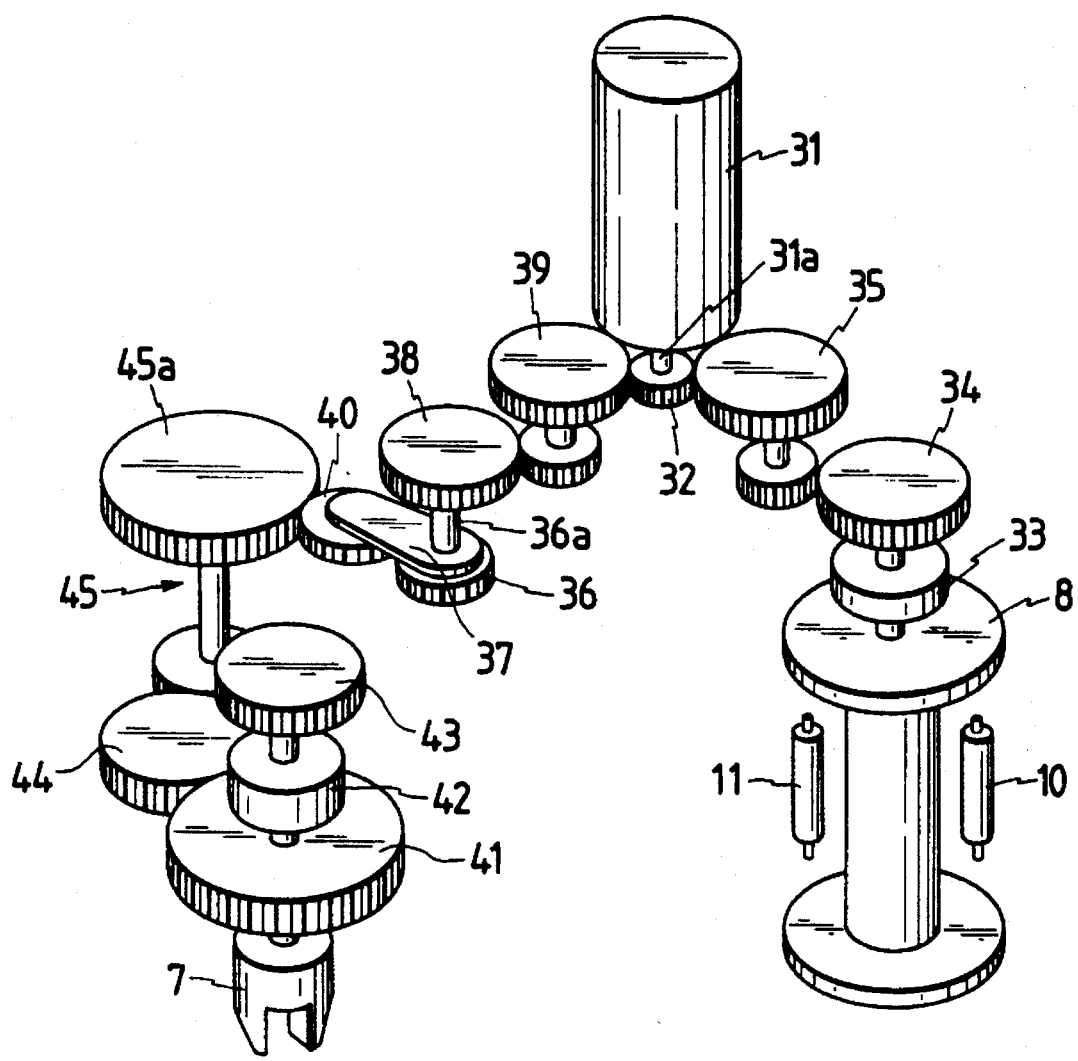

FIGS. 7 and 8 show a film feeding mechanism of the embodiment of the camera hereof, FIG. 7 showing the state from the film pushing-out to the film winding and FIG. 8 showing the state of the film rewinding.

Figures 1B, 10:
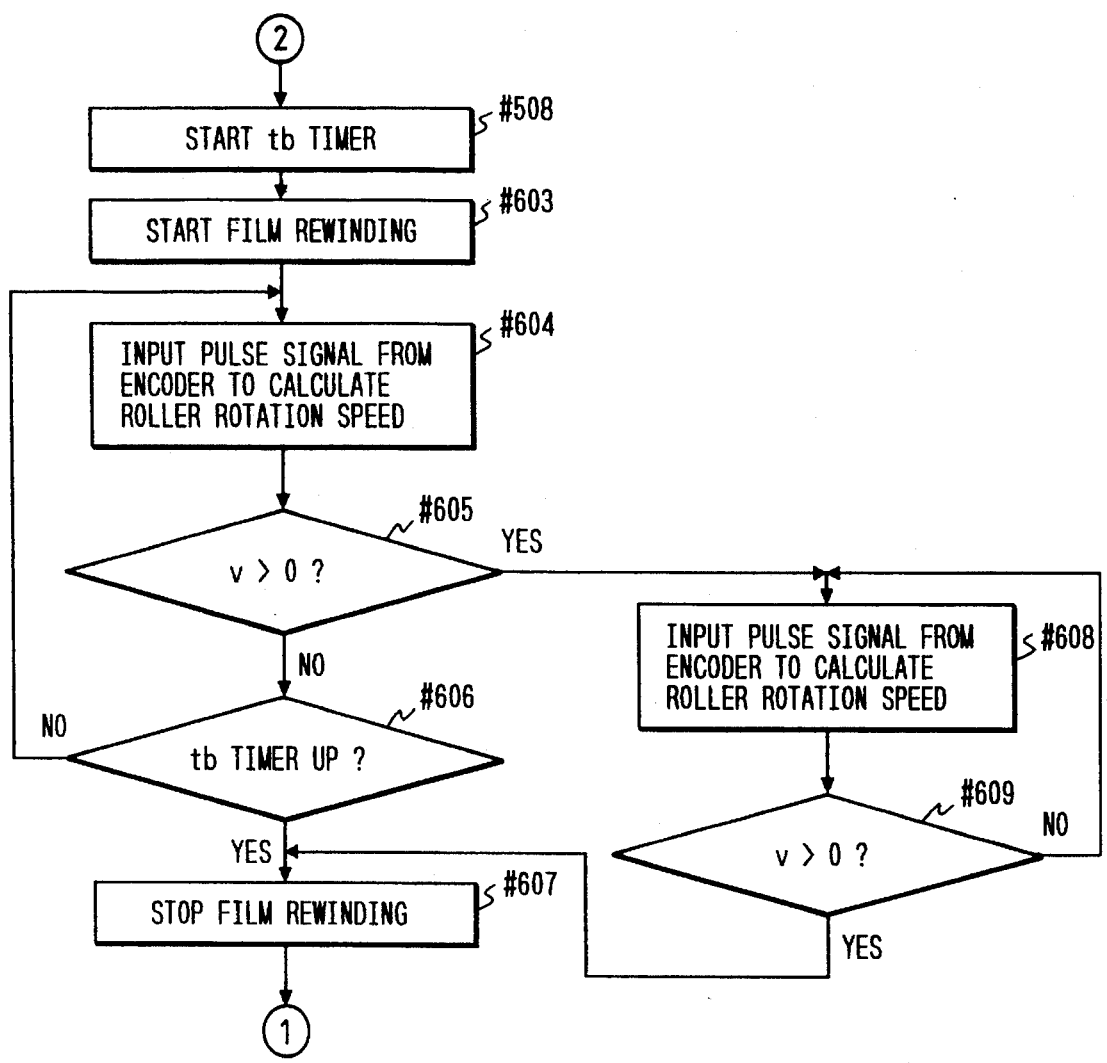
Figure 31:
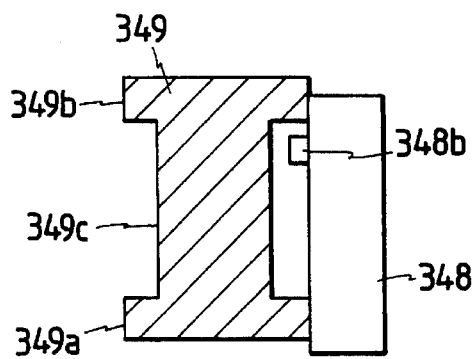
FIG. 31 is a vertical cross-sectional view showing a different location between the magnetic head and roller member.

In FIGS. 7 and 8, 31 is a film driving motor where the pinion 32 is stationed to the output axis 31a. 8 is the winding spool as described in FIG. 5, and 10 and 11 are rollers. The winding gear 34 is installed above the winding spool 8 through the one-way clutch 33. The one-way clutch 33 is, for example, a known free revolution clutch as indicated in Japanese Laid-Open Patent Application No. 55-17175 assigned to the applicant hereof, and relays driving forces to the winding spool 8 when the winding gear 34 in FIG. 7 turns counterclockwise, but reversely does not relay the driving force when the gear 34 turns clockwise. 35 is a two-stack gear connecting said pinion 32 with the winding gear 34.

Thus, the pinion 32, two-stack gear 35 and the winding gear 34 comprise the gear train for film winding.

36 is a sun gear axially supporting a planetary lever 37 on a axis 36a for revolution, and on the top of which a gear 38 is stationed. 39 is a two-stack gear connecting the pinion 32 with the gear 38. On one end of said planetary lever 37, a planetary gear 40 is axially supported for revolution. 7 is the fork described in FIG. 6, on the top of which a rewinding gear 41 is stationed. Further on the rewinding gear 41, a push-out gear 43 is located through a one-way clutch 42. The one-way clutch 42 is of the same construction as of said one-way clutch 33, and relays the driving force to the fork 7 when the pushout gear 43 is turned counterclockwise in FIG. 7, but reversely does not relay the driving force when the push-out gear 43 is turned clockwise. Said planetary gear 40 engages with said push-out gear 43 as shown in FIG. 7 when said sun gear 36 being in the state of FIG. 8 is turned counterclockwise.

Thus, the pinion 32, the two-stack gear 39, the gear 38, the sun gear 36, the planetary gear 40 and the push-out gear 43 comprise the gear train for film pushing-out. The reduced speed ratio of the gear train thereof is set greater than that of said gear train for film winding.

The larger gear 45a of the two-stack gear 45 connected with the rewinding gear 41 through the gear 44 engages with the planetary gear 40 as shown in FIG. 8 when the sun gear 46 is turned clockwise in FIG. 7.

Thus, the pinion 32, the two stack gear 49, the gear 48, the sun gear 46, the planetary gear 40, the two-stack gear 45, the gear 44 and the rewinding gear 41 comprise the gear train for film rewinding. The reduced speed radio of the gear arrangements thereof is set greater than that of said gear arrangements for film winding.

The following shows the functions of the film feeding mechanism being constructed as mentioned.

First of all, the cartridge chassis 21 indicated in FIG. 3 is loaded into the cartridge chamber 6, but at this time the film 24 is not pushed out from the opening 25 of the cartridge chassis 21. When the back plate, not indicated in the figure, is closed, the back plate switch (indicated in FIG. 1) to be mentioned hereinafter will be turned on, the signal from which will excite the driving motor 31 to rotate first clockwise in FIG. 7. Then, the sun gear 36 will also turn clockwise, while the planetary gear 40 will revolve around the sun gear 36 clockwise, reaching the state of FIG. 8. Then, each gear of 32, 39, 38, 36, 40, 45, 44 and 41 are connected with each other while the rewinding gear 41 turns clockwise and the fork 7 in the same solid construction as of said gear 41 also turns clockwise. Thus, the feed spool 22 engaged with the fork 7 turns clockwise in FIG. 3 to rewind the film 24. The rewinding thereof can eliminate sticking of the film tip, due to dust or sticky matter, inside the film cartridge without causing the film to be bent.

Then, the film driving motor 31 is to be turned counterclockwise. As a result, the sun gear 36 turns counterclockwise, so that the planetary gear 40 revolves around the sun gear 36 counterclockwise, reaching the state of FIG. 7 where a planetary 40 is connected with the push-out gear 43. Thus, the push-out gear 43 being turned counterclockwise, driving force is relayed to the one-way clutch 42, causing the fork 7 to turn counterclockwise. Since the fork 7 is engaged with the engagement portions 22a of the feed spool 22 inside the cartridge chassis 21, the feed spool 22 turns counterclockwise in FIG. 4, causing the film 24 to be pushed-out from the opening 25. Then, as mentioned, the film 24 is pushed out without being bent, since the tip of the film does not get stuck with dust or sticky matters inside the cartridge. In this way, as the pushing-out of the film proceeds, the tip of the film 24 reaches the winding spool. As soon as the film driving motor 31 starts turning counterclockwise, the winding spool 8 turns counterclockwise as driven by the gear train for film winding consisting of each gear of 32, 35, and 34. Then, the one-way clutch 33 is relaying the driving force, since the winding gear 34 is turning counterclockwise. As a result, the tip of the film 24 is wound around the winding spool 8, starting the winding function. The revolution of the winding gear 34 becomes faster than that of the push-out gear 43 in that the reduced speed ratio of the gear arrangements for film pushing-out is larger than that of the gear arrangements for film rewinding. Thus, the fork 7 is driven by the winding gear 34 through the winding spool 8, the film 24 and the feed spool 22, so that said fork 7 turns faster than the push-out gear 43, causing the one-way clutch 42 to cut off the relaying of the driving force. Namely, as a result of the fork 7 turning faster than the push-out gear 43, the push-out gear 43 looks as if it is turning reversely in a relative view, causing the one-way clutch 42 to cut off the relaying of driving force. Consequently, as soon as the tip of the film 24 starts to wind around the winding spool 8, the winding spool 8 alone starts the winding function for the film 24.

When all the frames of the film 24 are photographed, the end of the photographing for the film 24 is detected as hereinafter mentioned, the detection signal of which activates the film driving motor 31 to start turning clockwise in FIG. 7 as opposed to the winding function. Then, the sun gear 36 turns clockwise, while the planetary gear 40 revolves around the sun gear 36 clockwise, reaching the state of FIG. 8. Then, each said gear of 32, 39, 38, 36, 40, 45, 44 and 41 are connected with each other, causing the rewinding gear 41 to turn clockwise, while the fork 7 in the same solid construction as of said gear 41 also turns clockwise. Thus, the feed spool 22 engaged with the fork 7 turns clockwise in FIG. 7, starting the rewinding function for the film 24. It should be noted that as a result of the film driving motor 31 turning clockwise, the winding gear also turns clockwise, but since the reduced speed ratio of the gear arrangements for film rewinding is larger than that of those for film winding as mentioned, the revolution of the winding gear 34 becomes faster than that of the winding spool 8 turning clockwise driven through the fork 7, the feed spool 22 and the film 24, causing the one-way clutch 33 to cut off the relaying of the driving force. Thus, the film can be rewound without causing any interruption to the gear train for film winding.

It should be noted that film cartridges compatible with the film feeding system aforementioned are not limited to the one used in said embodiment, and can be of any other construction where the film can be pushed out from the film cartridge as a result of the revolution of the feed spool.

FIG. 1 is an example of an electric circuit block diagram that can control the functions thereof.

In said figure, 101 is a perforation detection circuit consisting of photo reflector capable of detecting the perforation of said film 24; 102 is a film driving circuit which drives motor 31 that does the winding and rewinding as well as the pushing-out of said film 24; 103 is a CPU, which is a micro-computer that controls the whole of the camera; 104 is a photometry circuit directing an appropriate light exposure to the film 24; 105 is a shutter control circuit controlling the opening/closing of the shutter; 106 is a back plate switch for turning on/off corresponding to the opening/closing of the back plate; 107 is a release switch for turning on/off corresponding to the manipulation by the photographer of the shutter release button; 108 is a cartridge detection switch detecting whether the film cartridge is loaded or not; 109 is an ISO and frame numbers detection circuit detecting ISO data and a number of frames of the film 24; and 110 is an indication circuit alarming a blank feeding failure.

Figures 2, 2A, 10:
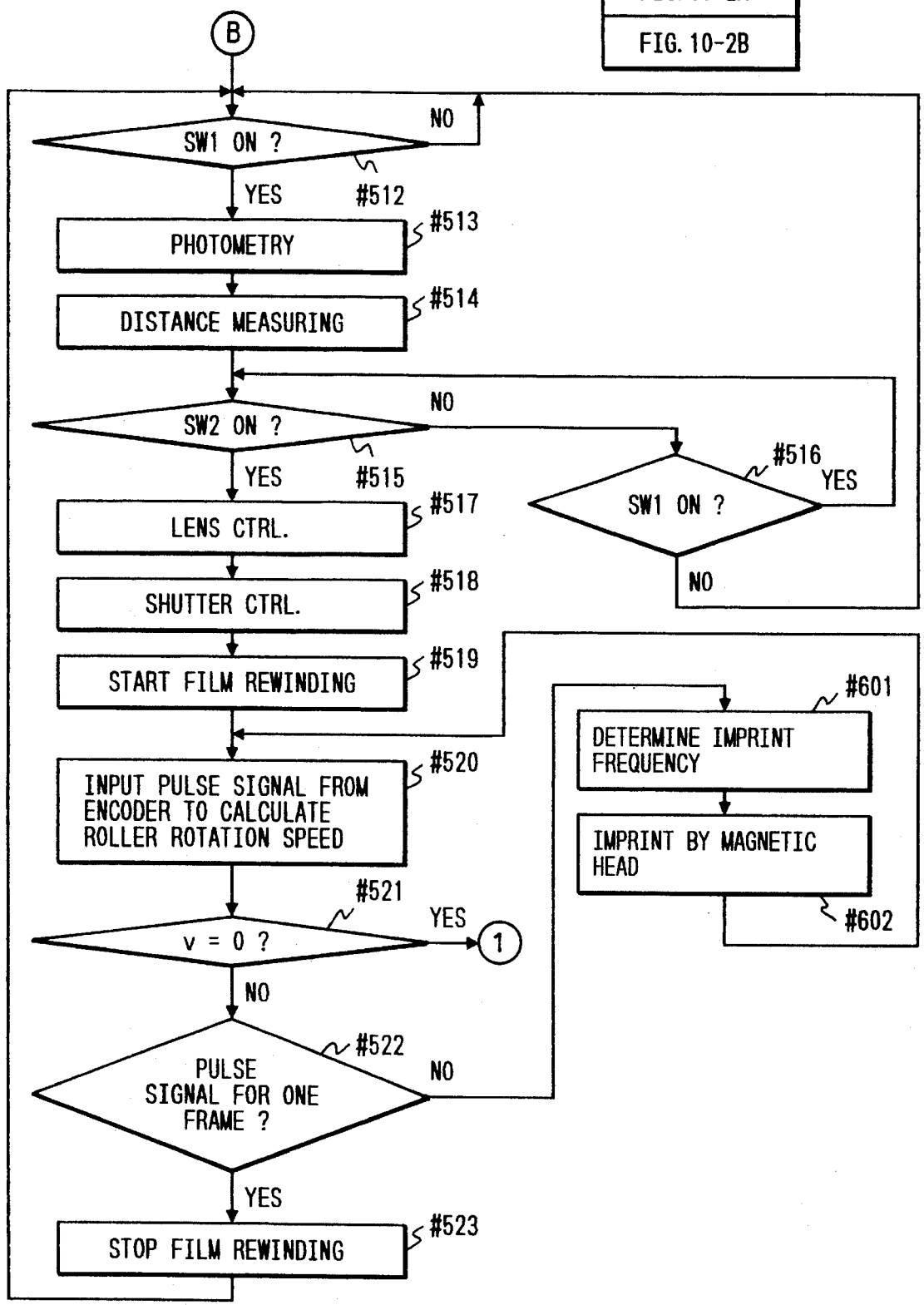
Figures 2B, 10:
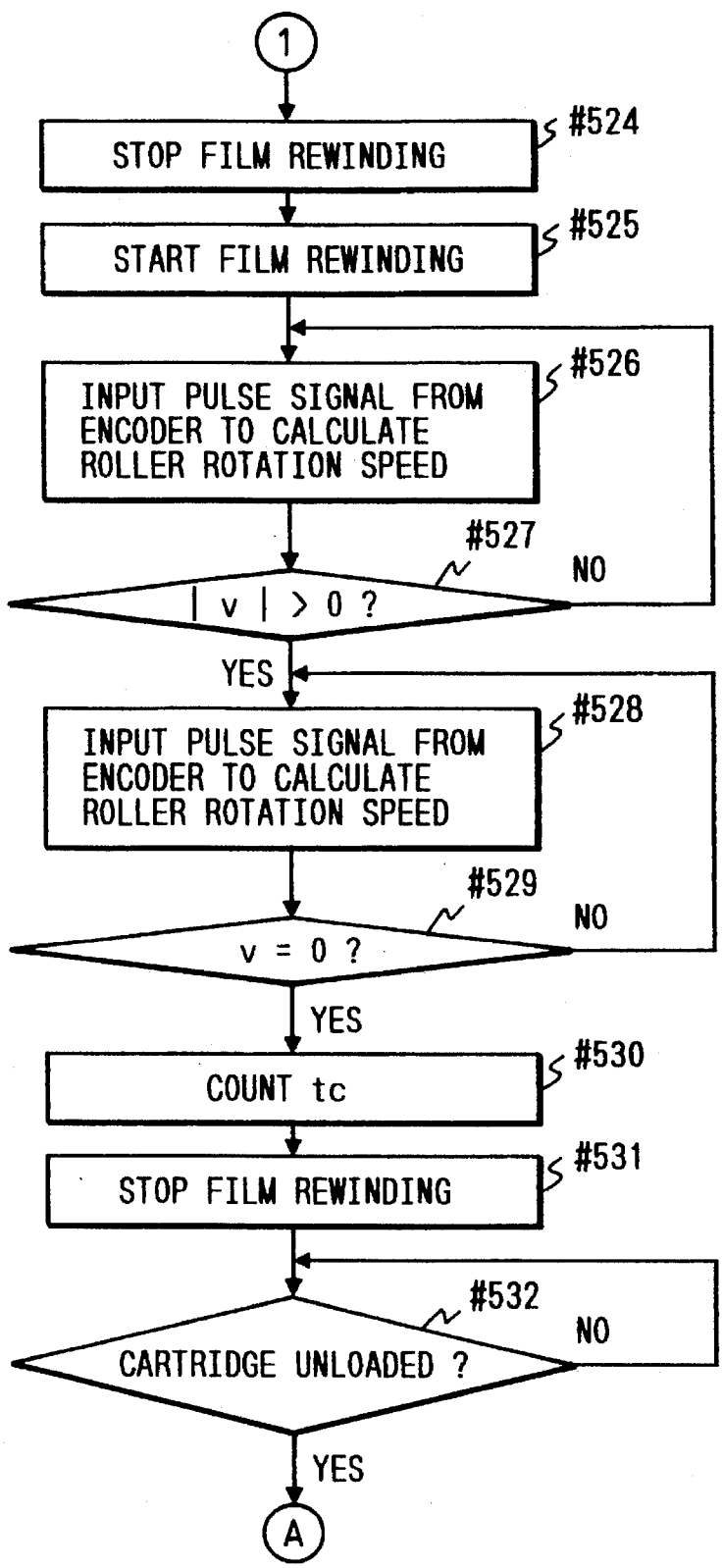

FIG. 2 is a flow chart showing the functions of CPU 103 indicated in FIG. 1. In accordance with the flow chart thereof, the functions of the circuit indicated in FIG. 1 will be described hereinafter.

At Step 201, whether the back plate is open or closed is identified by checking the status of a back plate switch 106. If the back plate is closed, Step 201 proceeds to Step 202, and if it is open, Step 201 is repeated.

At Step 202, whether the film cartridge is loaded or not is identified by checking the status of a cartridge detection switch 108. If the cartridge is loaded, Step 202 proceeds to Step 203, and if it is not loaded, steps 201 and 202 are repeated.

At Step 203, the number of the frames in the film 24 is detected by the ISO and frame numbers detection circuit 109.

At Step 204, whether the frame number information exists or not is identified. If such information exists, Step 204 proceeds to Step 205, and if it does not exist, Step 204 proceeds to Step 206.

At Step 205, timer times T1 and T2 are set depending upon the number of the frames. This is because the amount of the spool to be blank-fed differs when there are variations in the number of the frames existing from one film to another loaded into same film cartridge. When the number of the frames left unphotographed is high, the timer times T1 and T2 should be set shorter, and when the number of the frames left unphotographed is low, the timer times T1 and T2 should be set longer.

At Step 206, the timer times T1 and T2 are set at the specified values corresponding to the longest time possible, since the information on the number of the frames is not available.

At Step 207, the value of the film counter N is reset to "0".

At Step 208, the rewinding of the film 24 in the cartridge chassis 21 is done as mentioned by the film driving circuit 102.

At Step 209, the timer time T1 set at either Step 205 or 206 is counted. Step 209 proceeds to Step 210 upon the counting.

At Step 210, a film driving motor 31 is made to stop, completing the rewinding function of said film 24.

At Step 211, as mentioned the film driving motor 31 is made to rotate in the reverse direction as aforesaid, so that the film 24 is pushed-out from the cartridge chassis 21.

At Step 212, the timer time T2 set at either Step 5 or 6 starts to be counted.

At Step 213, perforations are detected by a perforation detection circuit 101. The detection method at this step is such that although the tip of the film does not have a perforation, said perforation circuit can substitutionally detect said film 24 being fed, by said push-out function, into where the film 24 did not exist. If perforations are not detected hereof, Step 213 proceeds to Step 214.

At Step 214, whether the timer time T2 has elapsed or not is identified. If it has not elapsed, Steps 213 and 214 are repeated, and if it has elapsed, the blank feeding is deemed not to have been done properly, and therefore Step 214 proceeds to Step 215.

At Step 215, the film driving motor 31 is made to stop, and Step 215 proceeds to Step 240.

At Step 240, one is added to the value of the blank feeding counter AL indicating the number of the blank feeding times.

At Step 241, whether the number of the blank feeding times has exceeded four times or not is judged, and if it has not exceeded four times, Step 241 returns to Step 201, where blank feeding is repeated after rewinding is done.

On the other hand, if the number of the blank feeding times is judged to have exceeded four times at Step 241, Step 241 proceeds to Step 242 without further repeating the blank feeding function based on an assumption that the blank feeding function will not be successful even if blank feeding is repeated further. In this embodiment, the judgment of the blank feeding times is set at four times, but the number can be set at any figure depending on requirements.

At Step 242, the indication circuit 110 is made to indicate an AL (Automatic Loading) Miss which means a blank feeding failure, and then Step 242 proceeds to Step 243.

Step 243 waits until the back plate becomes open (identified by the status of back plate switch 106) and the film 24 is removed, and upon the opening of the back plate, proceeds to Step 244 where the blank feeding counter AL is reset to "0", and then returns to Step 201.

On the other hand, when perforations are detected at Step 213 meaning that the film 24 is detected, Step 213 proceeds to Step 239.

At Step 239, an AL Miss indication indicated by circuit 110 is turned off (and if AL Miss is not indicated in the figure, then directly proceed to Step 217).

At Step 217, the timer T3 is made to start.

At Step 218, perforations are detected by the perforation detection circuit 101. If perforations are detected, Step 218 proceeds to Step 219, and if perforations are not detected, Step 218 proceeds to Step 220.

At Step 219, the number of the perforations is counted.

At Step 220, said timer T3 judges whether or not it has elapsed one second or more (the number of seconds is longer time than that expected to be required in the film winding, and can be set at any figure depending on requirements), and if it has elapsed one second or more, namely meaning that there were no perforations detected even after winding for one second or more, it is judged that the photographing of the last frame of the film 24 has been complete so that the pushing-out of the film cannot be done any further, causing Step 220 to proceed to Step 221.

At Step 221, the film driving motor 31 is driven so that the film 24 starts to be rewound as aforesaid.

At Step 222, the perforation counter is reduced each time a perforation is detected.

At Step 223, whether the value of the perforation counter is in increments of 8 or not (based on an assumption that the rewinding for one frame completes when the counter counts 8 perforations) is judged, and if it is in increments of 8, Step 223 proceeds to Step 224, and if it is not in increments of 8, Step 223 returns to Step 222.

At Step 224, one number is reduced from the value of the film counter N.

At Step 225, whether the value of the film counter is "0" or not is judged, and if it is not "0", Step 225 returns to Step 222, and if it is "0", Step 225 proceeds to Step 226.

At Step 226, the function in the winding direction is continued for the set time duration.

At Step 227, the driving for the driving motor 31 is made to stop, and Step 227 proceeds to said Step 243.

On the other hand, if the timer T3 has not elapsed one second at said Step 220, Step 220 proceeds to Step 229.

At Step 229, whether the value of the perforation counter is in increments of 8 or not (based on an assumption that the winding for one frame completes when the counter counts 8 perforations) is checked. If it is not in increments of 8, Step 229 returns to Step 217, and if it is in increments of 8, Step 229 proceeds to Step 230.

At Step 230, one number is added to the value of the film counter N.

At Step 231, said timer T3 is reset.

At Step 232, whether "N≧4" or not is judged, and if N<4, Step 232 returns to Step 217, and if N≧4, Step 232 proceeds to Step 233. This is based on an assumption that three frames from the film tip are blank-fed and that the fourth frame is used as the first frame to be photographed.

At Step 233, the film driving motor 31 is made to stop, causing the film winding to be stopped.

At Step 234, the value of "film counter value N−3" is indicated on the indication circuit 110.

At Step 235, whether the release switch 107 is turned on or not is judged, and if Step 235 detects the switch 107 is turned on, it proceeds to Step 236.

At Step 236, the photomerry circuit 104 is activated to obtain photometry information.

At Step 237, the shutter control circuit 105 is activated to do the opening/closing of the shutter.

At Step 238, one-frame winding of the film 24 is made to start and Step 238 returns to Step 217, repeating the photographing sequence.

In said embodiment, taking into consideration that there are cases where film may be pushed out a little bit from the cartridge after Step 242, rewinding may be done for a specified time duration.

In said embodiment also, the indication circuit alarming a blank feeding failure can be of any type such as one including a buzzer.

The other embodiments of the present invention will be hereinafter described.

Figure 21:
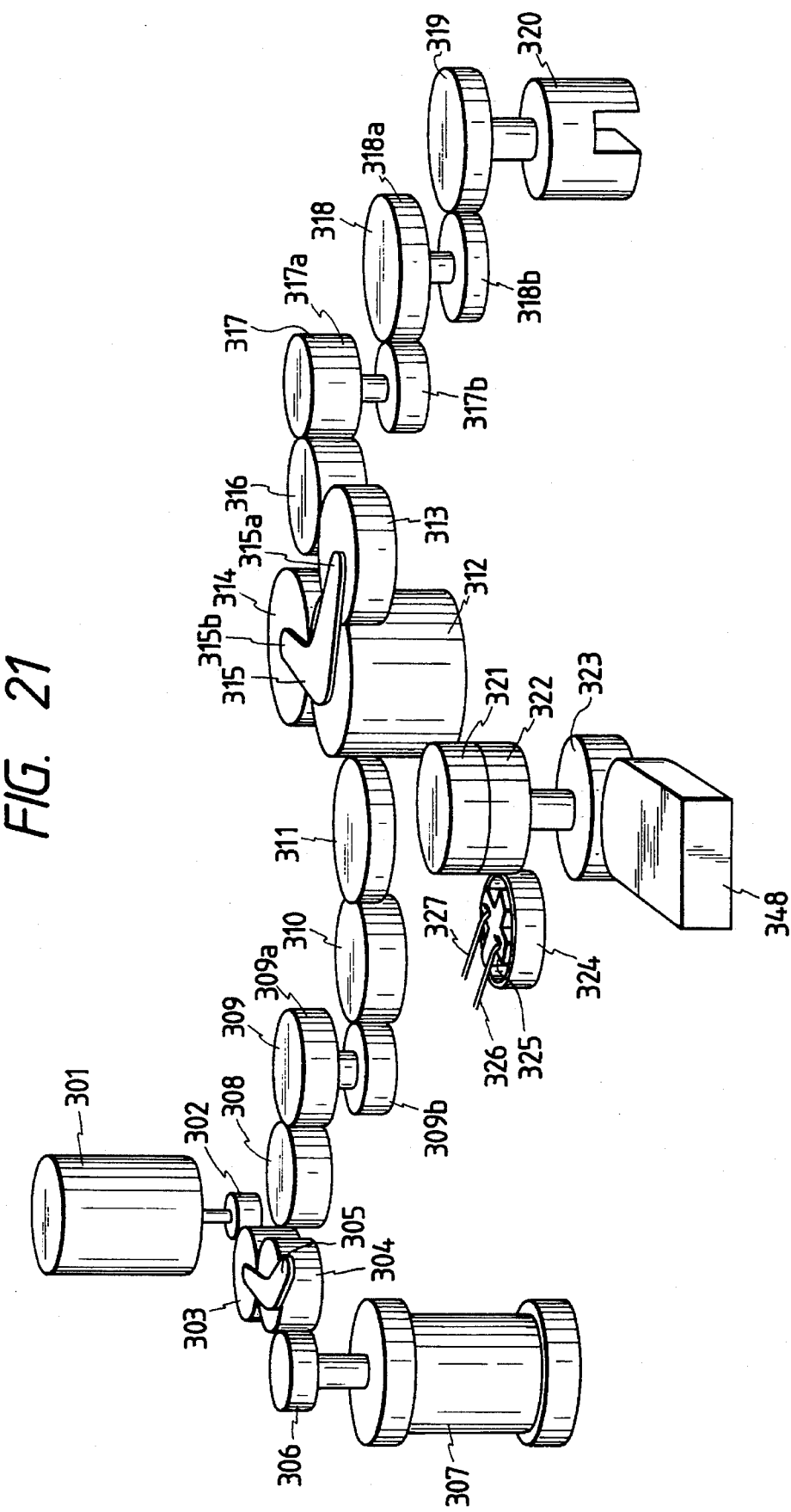
FIG. 21 shows a side view of the film feeding mechanism utilized in this embodiment example.
Figure 22:
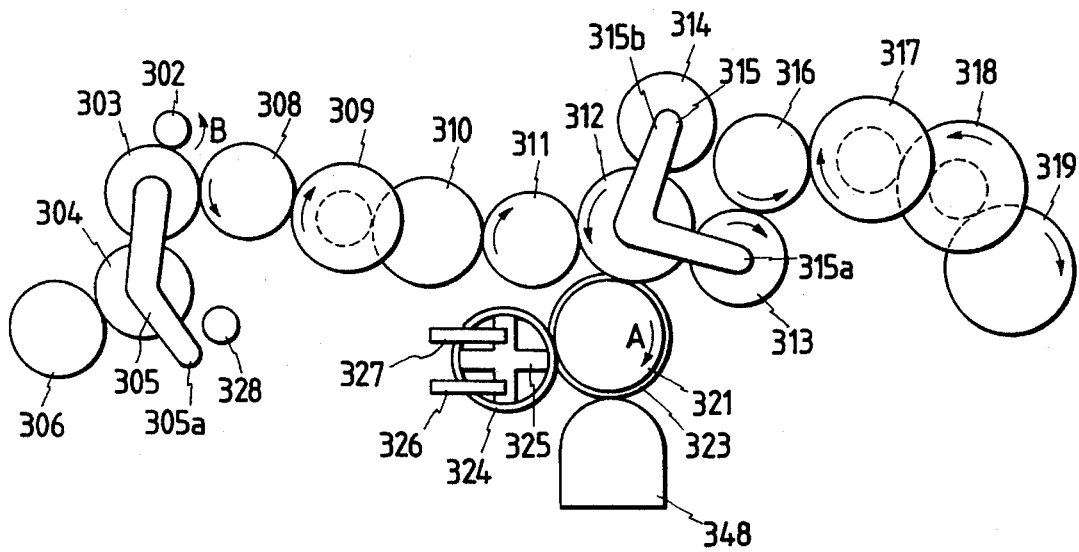
FIG. 22 is a plan view showing gear arrangements at the time of film winding of said embodiment example.
Figure 23:
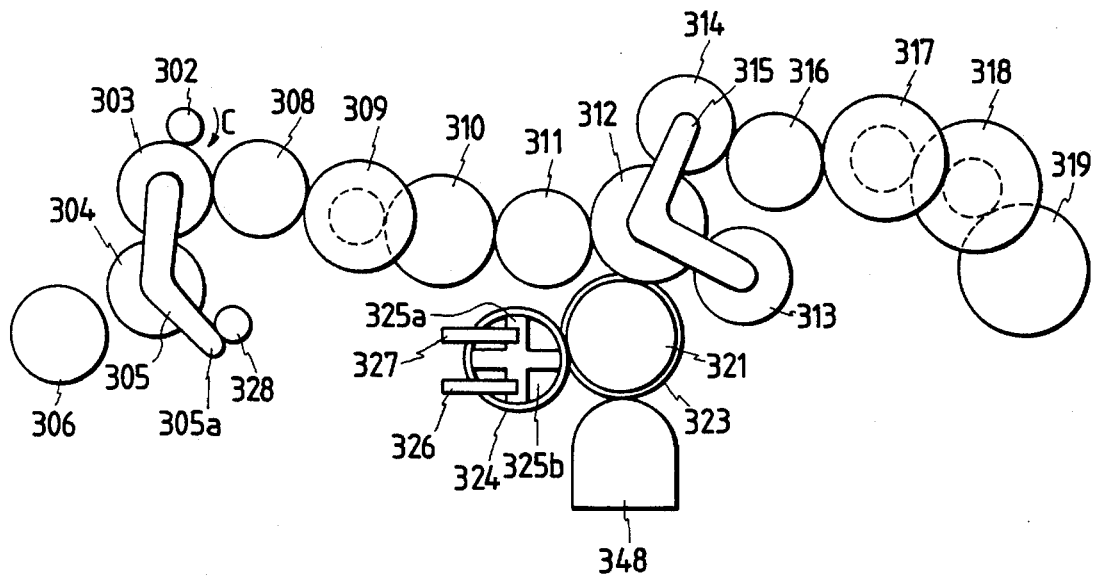
FIG. 23 is a plan view showing gear arrangements at the time of film rewinding of said embodiment example.
Figure 24:
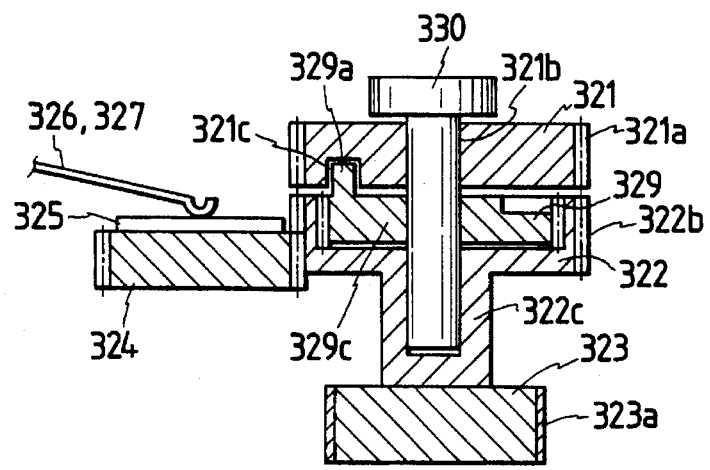
FIG. 24 is a vertical cross-sectional view of the one-way clutch mechanism as indicated in FIG. 21.
Figure 25:
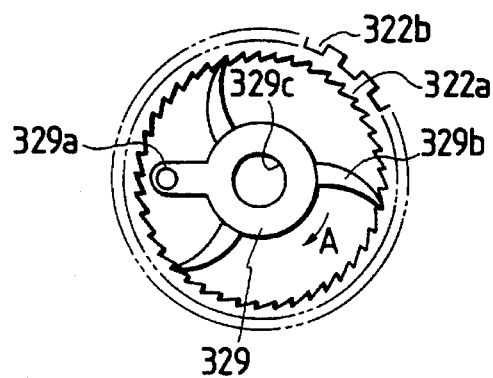
FIG. 25 is a plan view of the critical construction of the one-way clutch mechanism as indicated in FIG. 21.
Figure 26:
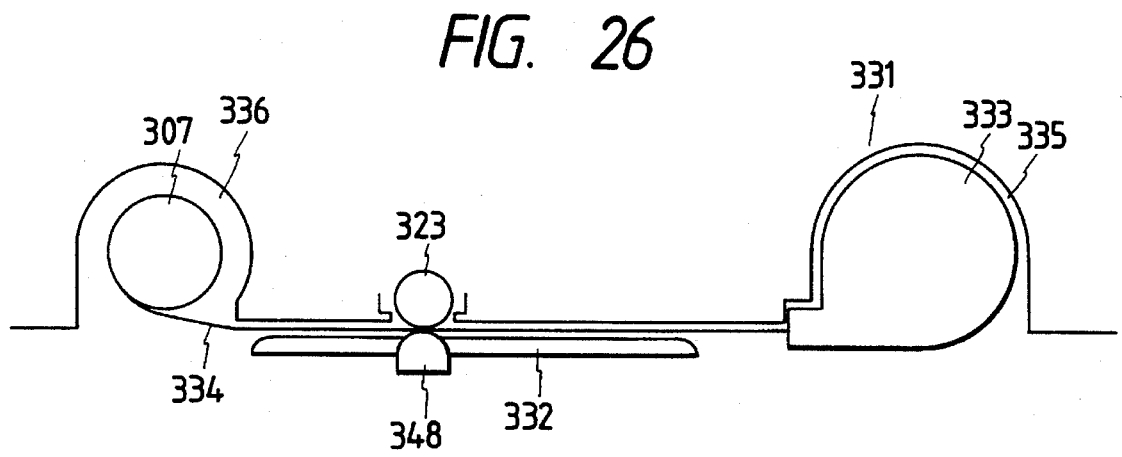
FIG. 26 is a side cross-sectional view showing the construction of the critical components of the camera of this embodiment example.

FIGS. 21 through 26 shows mechanical constructions related to each embodiment hereinafter, FIG. 21 being a side view of a film feeding mechanism, FIG. 22 being a plane view of gear arrangements at the time of film winding, FIG. 23 being a plane view of gear arrangements at the time of film rewinding, FIG. 24 being a cross-sectional view of a one-way clutch, FIG. 25 being a side cross-sectional view thereof, and FIG. 26 being a side cross-sectional view of critical components of the camera.

In these figures, 301 is a film driving motor which turns forward (in the arrow B direction in FIG. 22) for film winding and turns backward (in the arrow C direction in FIG. 23) for film rewinding. 302 is a pinion gear to be stationed on the rotational axis of said motor 301. 303 is a first planetary gear engaged with said pinion gear 302. 304 is a first planetary gear engaged with said first sun gear 303. 305 is a first connecting lever connecting the first sun gear 303 with a first planetary gear 304 where the first connecting lever 305 supports said first planetary gear 304 rotatably in creating a frictional force against the first planetary gear 304, so that turning the first sun gear 303 causes the first planetary gear 304 to revolve around the sun gear 303 with the gear 303 being the center of the revolution. Said first sun gear 303, first planetary gear 304 and first connecting lever 305 comprise a known planetary gear mechanism. 306 is a spool gear that engages with a first planetary gear 304 only when said film driving motor 303 turns forward. 307 is a film winding spool stationed to said spool gear 306 and moves with the spool gear 306 in a solid manner.

308 is a first idler gear that always engages with said first sun gear 303. 309 consists of the larger gear part 309a and smaller gear part 309b, 309a being a first tack gear engaged with said first idler gear 308. 310 is the second idler gear engaged with the smaller gear part 309b of said first two-stack gear 309. 311 is the third idler gear engaged with said second idler gear 310. 312 is the second sun gear engaged with said third idler gear 311. 313 is a second planetary gear engaged with said second sun gear 312. 314 is a third planetary gear and like said second planetary gear 313, is engaged with the second sun gear. 315 is a second connecting lever connecting said second sun gear 312, second planetary gear 313 and third planetary gear 314 together respectively with the arm parts 315a and 315b where each planetary gear is supported rotatably by means of creating a frictional force, so that turning the second sun gear 312 causes a second planetary gear 313 and the third planetary gear 314 to revolve around said second sun gear 312 with the sun gear 312 being the center of the revolution. Said second sun gear 312, second and third planetary gears 313 and 314, and a second connecting lever 315 comprise a known planetary gear mechanism.

316 is a fourth idler gear, and engages with the second planetary gear 313, but not with the third planetary gear 314, upon the counterclockwise revolution of the second connecting lever 315 with the second sun gear 312 being the center of the revolution when the film driving motor 301 turns forward, and engages with the third planetary gear 314, but not with the second planetary gear 313, upon the clockwise revolution of the second connecting lever 314 when the film driving motor 301 turns backward. 317 consists of the larger gear part 317a and smaller gear part 317b, the larger gear part 317a being the second two-stack gear engaged with the fourth idler 316. 318 consists of the larger gear part 318a and smaller gear part 318b, the larger gear 318a being the third two-stack gear engaged with the smaller gear part 317b of said second two-stack gear 317. 319 is a fork gear engaged with the smaller gear part 318b of said third two-stack gear 318. 320 is a fork turning with said fork 319 in a solid piece manner, and turns the feed spool inside the film cartridge 333 (refer to FIG. 26), pushing-out/winding the film 334 from the inside of the above cartridge 333.

321, 322 and 329 (refer to FIG. 24) are one-way clutches, 321 being a gear engaged with the second sun gear 321, 322 being a ratchet gear which has the teeth part 322a all around the inside peripheral and the gear 322b outside as shown in FIG. 25, and 329 being a ratchet pawl member having the resilient pawl parts 329b engaging with the teeth pat 322a of the ratchet gear 322. When a relative speed takes place in the arrow A direction (refer to FIG. 22) against the ratchet gear 322 of said ratchet pawl member 329, the ratchet pawl member 329 relays driving force to the ratchet gear 322, and when a relative speed takes place in the reverse direction from the arrow a direction, the pawl parts 329b become bent and slide on the teeth part 322a so that the ratchet pawl member 329 does not relay driving force to the ratchet gear 322. As shown in FIG. 24, said ratchet pawl member 329 has the pin 329a mating with the hole 321c of the gear 321 so that the ratchet pawl member 329 always turns with the gear 321 in a solid piece manner. 330 is an base plate (not indicated in the figure) where the gear 321, the ratchet pawl member 329, and each hole of 321b, 329c and 322c of the ratchet gear 322 are respectively mated for revolution as shown in FIG. 24. 323 is a roller member stationed to the ratchet gear 322 where the out side peripheral part 323a is provided with rubber or roulette so that slipping can be prevented.

324 is a pulse gear engaged with the gear part 322b of the ratchet gear 322. 325 is a pulse plate consisting of the conductive part 325a and a non-conductive part 325b, and is stationed onto said pulse gear 324. 326 and 327 are contractors to detect the pulses equivalent to the amount of the revolution of the roller member 323 by means of contacting the conductive part 325a and non-conductive part 325b of the pulse plate 325.

328 is a stopper (refer to FIG. 23) stationed to the base plate (not indicated in the figure) and controls the counter-clock revolution position of said first connecting lever 305 by contacting an end part 305a of the first connecting lever 305.

331 is a camera main body (refer to FIG. 26), 332 is a pressing plate, 335 is a cartridge chamber, and 336 is a spool chamber. 384 is a magnetic head equipped on said pressing plate 332.

Said roller member 323 is located as shown in FIG. 26 where a magnetic head 348 is preset to pressurize from the beginning so that the magnetic memory-part (not indicated in the figure) can stably get in touch with said magnetic head 348, or where said magnetic head 348 is installed a certain clearance away from the roller member 323 so that a thickness of a film 334 provides a required pressure to the magnetic head 348 while the film 334 passes through the clearance between the magnetic head 348 and roller member 323. As can be seen from the above, said roller member 323 comprises one film feeding system, and rotates as the film 334 moves. In connection thereof, the pulse plate 325 rotates through the gear 322 so that a pulse signals takes place at contractors 326 and 327.

In the construction thereof, after the film cartridge 333 similar to the one indicated in FIGS. 3 through 5 is loaded into the cartridge chamber 335, as shown in FIG. 22, the revolution of the film driving motor 301 (the pinion gear 302) in the arrow B direction (forward revolution) causes the first sun gear 303 to rotate clockwise. In connection thereof, due to the action of the first connecting lever 305, a first planetary gear 304 revolves clockwise with said first sun gear 303 being the center of the revolution and shortly engages with the spool gear 306 so that the driving force of said film driving motor 301 is relayed to the spool gear 306, causing the film winding spool 307 to rotate clockwise.

Also, the driving force thereof is relayed through the idler gear 308, which is another gear engaged with said first sun gear 303, and further through a first two-stack gear 309, a second idler gear 310 and a third idler gear 311 to a second sun gear 312. Thus, since said sun gear rotates counterclockwise, due to the action of the second connecting lever 315, a second planetary gear 313 and a third planetary-gear 314 revolves with said second sun gear being the center of the revolution. Shortly the second planetary gear 313 becomes to engage with a fourth idler gear 316. As a result, the driving force in the arrow B direction of said film driving motor 301 is relayed to the fourth idler gear 316 as the counterclockwise driving force, and is further relayed to the fork 320 through the second two-stack gear 317 and the third two-stack gear 318, causing the fork 320 to rotate clockwise.

Furthermore, upon the revolution of the second sun gear as shown above, the clockwise driving force (in the arrow A direction) is relayed to the gear 321 engaged with said second sun gear 312. Thus, until the film becomes wound on the spool 307, due to the action of the one-way clutch consisting of the gear 321, the ratchet gear 322 and the ratchet pawl member 329, the one way clutch rotates in a solid piece manner (details of which will be mentioned hereinafter). In connection thereof, the roller member 323 also rotates clockwise. As a result of the revolution of said ratchet gear 322, the pulse gear 324 engaged thereof also rotates where a set of the pulse plate 325 and the contractors 326 and 327 gives off a pulse signal equivalent to the amount of the revolution of said roller member 323. The pulse signal thereof is detected by the encoder circuit indicated in FIG. 1 (to be mentioned hereinafter) where the revolution speed and the amount of the revolution of the roller member 323 (the feeding speed and feeding amount of the film 334) are calculated.

The reduced speed ratios of the gear arrangements thereof are set as follows.

Where the circumferential velocity of the film winding spool 307 is "V1", the circumferential velocity of the roller member 323 "V2", the velocity of the film 334 pushed-out from the film cartridge 333 by the fork 320 "V3", the following relation exists: "V1>V2>V3".

As the film 334 is pushed-out from the film cartridge 333 due to the clockwise revolution of said fork 320, the film tip becomes in contact with both the roller member 323 and the magnetic head 348 in that the roller member 323 always pushes said film 334 onto the magnetic head 348.

In the construction of the embodiment, hereof, since the roller member 323 is turning clockwise, the film tip can be smoothly fed from the right to the left in FIG. 22 by means of the frictional force between the film 334 and the roller member 323. Also, since the rotation speed is set as "V2>V3", in the case the film 334 is fed out by the roller member 323 thereafter, the driving force (speed) thereof is relayed through the film 324 to, in turn, the fork gear 319, the third two-stack gear 318, a second two-stack gear 317 and the fourth idler gear 316 where the speed to the counterclockwise revolution of a fourth idler gear 316 becomes higher than that of the clockwise revolution of the second planetary gear 313. At that time, the fourth idler gear 316 flips the second planetary gear 313 so that momentarily the second planetary gear 313 disengages from the fourth idler gear 316, absorbing the difference in the speeds.

When the film 334 is further fed out and becomes wound on the film winding spool 307 by a known method (a method where the perforations of the film 334 get caught by the teeth provided on the film winding spool 307 or by a method installed on the main body to press the film 334 onto the film winding spool, or similar methods), the roller member 323 starts to rotate due to the frictional force between the roller member 323 and the film 324 as a result of the relation "V1>V2>V3". Said roller member 323 rotates faster than the gear 321, but the rotational force of the roller member 323 is not relayed to the gear 321 due to the action of the aforementioned one-way clutch. At that time, the feeding amount and feeding speed of the film 334 can be calculated by the encoder circuit indicated in FIG. 9 based on pulse signal, generated from the set of the pulse plate 325 and contractors 326 and 327. Furthermore, due to the relation "V1>V2", the feeding speed will greatly vary at the moment the film 334 is wound onto the film winding spool 307, but by looking at this speed variation, whether the automatic loading is completed or not can be judged.

The function of the film rewinding will be described as follows.

In FIG. 23, the revolution of the film driving motor 301 in the arrow C direction causes the first connecting lever 305 and the first planetary gear 304 to revolve counterclockwise with the first sun gear 303 being the center of the revolution until the end part 305a of said first connecting lever 305 gets in touch with the stopper 328. Thus, the first planetary gear 304 disengages from the spool gear 306.

At that time, the second sun gear 312 rotates clockwise where a second planetary gear 313 and a third planetary gear 314 revolve clockwise with said second sun gear 312 being the center of the revolution due to the action of the second connecting lever 315. As a result, the fourth idler gear 316 disengages from the second planetary gear 313, and instead the fourth idler gear 316 engages with the third planetary gear 314. Thus, the fork gear 319 rotates counterclockwise while the fork 320 causes the feed spool inside the film cartridge 333 (not indicated in the figure) to rotate reversely so that the film 334 starts to be wound into said cartridge 333.

At that time, although the roller member 323 is made to rotate counterclockwise by the film 334, the second sun gear 312 causes the gear 321 to rotate faster counterclockwise. Thus, the relative speed of the gear 321 against the ratchet gear 322 is in the counter-clockwise direction (as opposed to the arrow A direction) so that the driving force is not relayed from the ratchet gear 322 to the gear 321 due to the one-way clutch mechanism.

As the film 334 is being wound into the film cartridge 33 in the above-described way, shortly the film tip passe through the roller member 323. Then, the roller member stops turning so that no pulse signal is generated between the pulse plate 325 and contractors 326 and 327. Then, the rewinding of the film lasts for a specified time duration, and thereafter the motor is made to stop to complete the film rewinding operation (details of which are to be described hereinafter).

The direction results of the feeding amount and feeding speed of the film 334 are, for example, synchronized with the magnetic head 348 at the time of magnetic recording and are used to save a required magnetic memory into a specified position of the magnetic memory part. Also, said results can be used for the feeding control for one frame of the film 334 and utilized for the writing-in of information by such optical means as LED.

Figure 27:
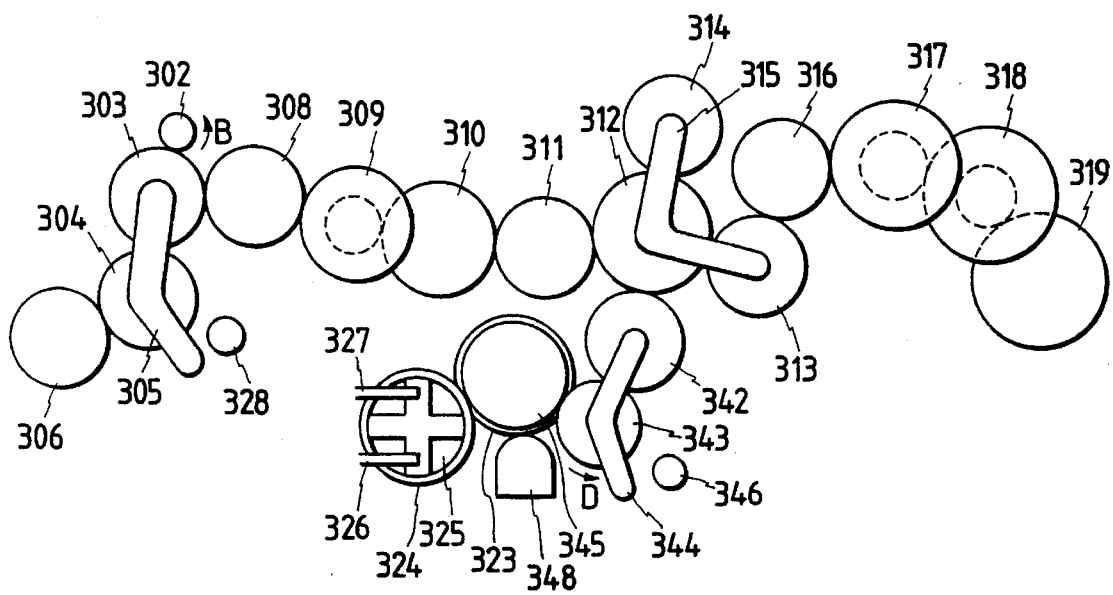
FIGS. 27 and 28 are plan views showing different examples other than those examples of the roller member driving gear arrangements shown in FIGS. 21 through 23.
Figure 28:
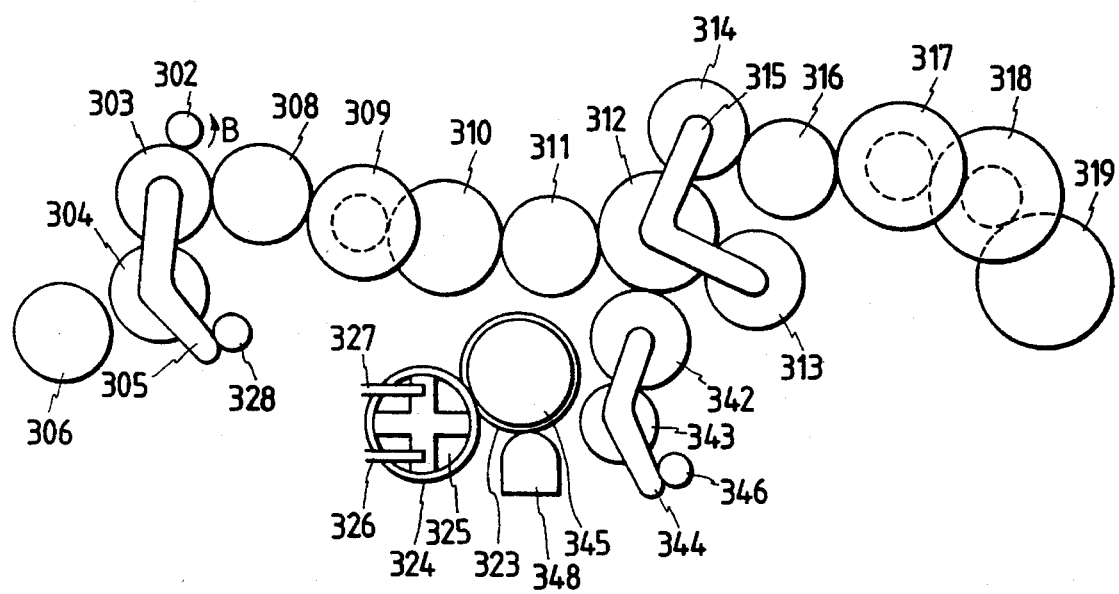

FIGS. 27 and 28 show one of the other embodiments of said one-way clutch consisting of 321, 322 and 329 indicated in FIGS. 21 through 23, FIG. 27 being a plane view of the gear arrangements for film winding and FIG. 28 being a plane view of the gear arrangements for film rewinding.

In the figures thereof, 342 is the third sun gear engaged with the second sun gear 312; and 343 is the fourth planetary gear engaged with said third sun gear 342. 344 is the third connecting lever connecting said third sun gear with said fourth planetary gear 343, and causes the fourth planetary gear 343 to revolve counterclockwise with said third sun gear 342 being the center of the revolution when the third sun gear 342 turns counterclockwise, and causes the fourth planetary gear 343 to revolve clockwise when the third sun gear 342 turns clockwise. 345 is a gear engaged with said fourth planetary gear 343, to which the roller member 323 is installed in a one-piece construction. The gear 345 thereof is also engaged with the pulse gear 324. 346 is a stopper controlling the counterclockwise revolution of the third connecting lever 344.

In the same case as of the embodiment in FIGS. 21 through 23 aforementioned, the circumferential velocity of the film winding spool 307, the circumferential velocity of the roller member 323 and the velocity of the film 334 pushed-out by the fork 320 are set at "V1>V2>V3" so that the gear 345 receives through the roller member 323, a counterclockwise driving force that is faster in speed than that relayed from the third sun gear 342 when the film 334 is wound onto the spool 307 at the time of film rewinding, but then the gear 345 flips the fourth planetary gear 343 toward the arrow D direction, absorbing the difference in the speeds.

At the time of film rewinding, the engagement of the fourth planetary gear 343 with a gear 345 is disengaged by a third sun gear 342 (in the state in FIG. 11) so that the fork gear 319 causes the film 334 to be wound into the film cartridge 333.

Figure 29:
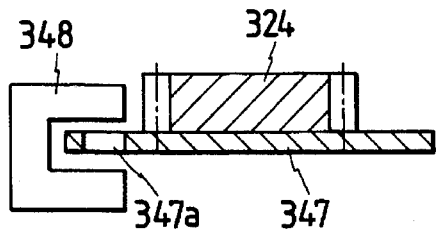
FIG. 29 is a vertical cross-sectional view showing the other construction of the pulse signal generating portion.

In the other embodiments, the pulse plate 325 and the contractors 326 and 327 are used to detect the film feeding amount, but in FIG. 29, the pulse gear 324 is used so that the film feeding amount can be optically detected by such means as a photo-interrupter.

In FIG. 29, 348 is a photo-interrupter, and 347 is a slit disc plate made of light-shielding materials stationed to the pulse gear 324 having the slit 347a.

In the construction thereof, the slit 347a is detected by the photo-interrupter 347, generating a pulse signal, corresponding to the rotation amount of the roller member 323.

Figure 30:
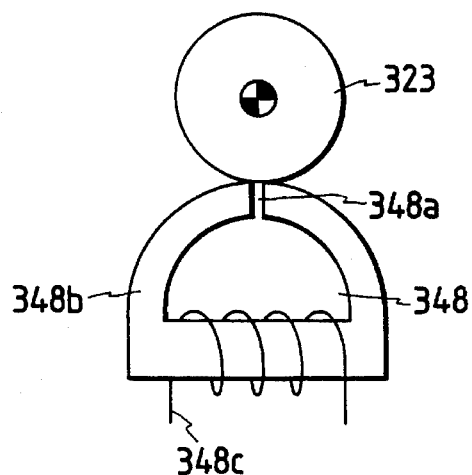
FIG. 30 is a plan view showing a location between the magnetic head and roller member as indicated in FIG. 21.

The configuration and the installed position hereinafter mentioned are preferred for said roller member 323 being the film pressing member. FIG. 30 is a cross-sectional view of the magnetic head 348 and the roller member 323, 348a being a magnetic gap, 348b being a core and 348c being a coil.

Namely, in the embodiment hereof, such a configuration as shown in FIG. 31 is preferred; otherwise dust (ground powder) can possibly get into the magnetic gap 348a of the magnetic head 348 or said magnetic head; can possibly get worn due to the fact that said roller member 323 is in a rotatable construction even when the film 343 is not positioned above the magnetic head 348.

FIG. 31 is a cross-sectional view where 349 is a roller member consisting of larger diameter portions 349a, 349b and a smaller diameter portion 349c. The larger diameter portion 349a and 349b are so located as to contact any other areas than the core 348b area of the magnetic head 348 or the magnetic gap 348a located at the tip thereof. Namely, the smaller diameter portion 349c should face the magnetic gap 348a and core 348b so that the roller member does not directly contact the magnetic gap.

Figure 32:
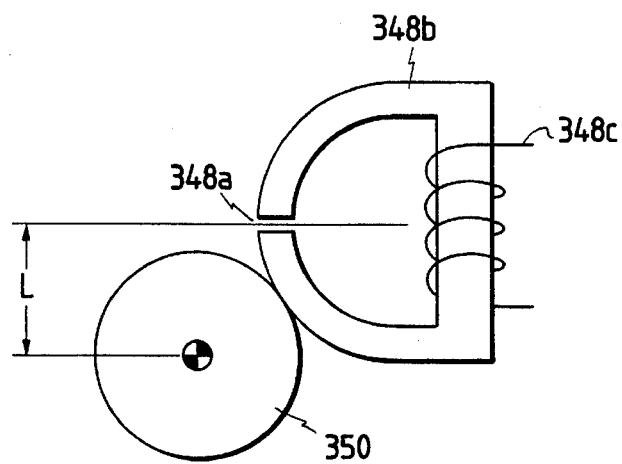
FIG. 32 is a plan view showing a different location between the magnetic head and roller member.

As shown in FIG. 32, said roller member 350 can be located at the distance L from the magnetic gap 348a so that the roller member contacts any other area than the magnetic gap 348a.

Figure 33:
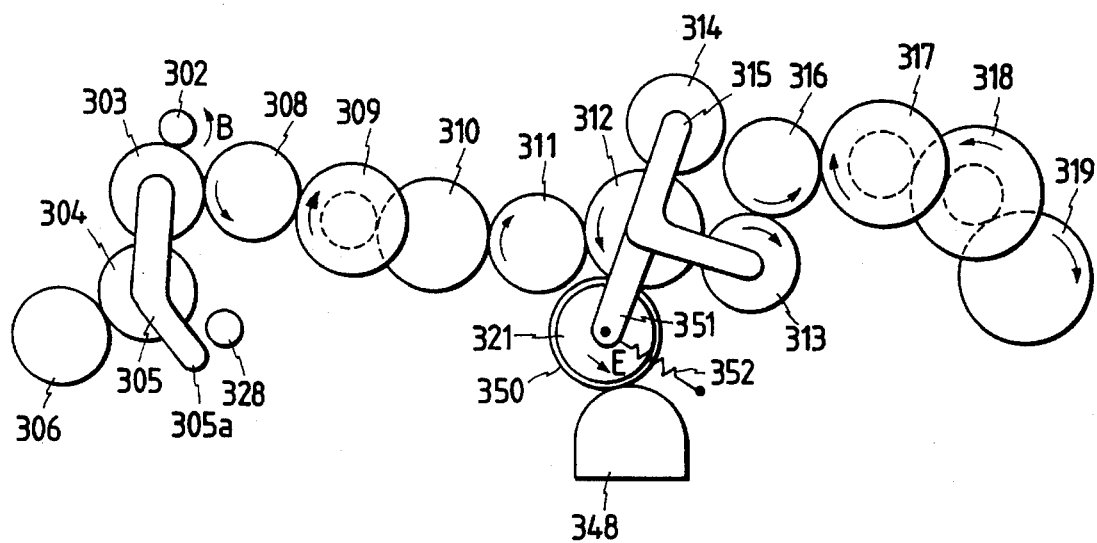
FIG. 33 is plan view showing a construction example of film feeding gear arrangements based on the location of FIG. 32.

In the case of the arrangements as shown in FIG. 32, a roller member 350 should be preferably pushed against the magnetic head by such a resilient means as a spring as shown in FIG. 33 so that the magnetic memory part of the film 334 can be stably pushed against the magnetic head 348.

In FIG. 33, 351 is a fourth connecting lever rotable with the second sun gear 312 being the center of the revolution, universally supports the gear 321, engages said gear 321 with the second sun gear 312, and is functionable completely independent from the second connecting lever 315. One end of 352 is installed to the base plate (not indicated in the figure) and the other end to said fourth connecting lever 351 so that the roller member 350 and the gear 321 are pushed toward the arrow E direction, namely, the roller member 350 is pushed against the magnetic head 348 at a constant force.

Figure 9:
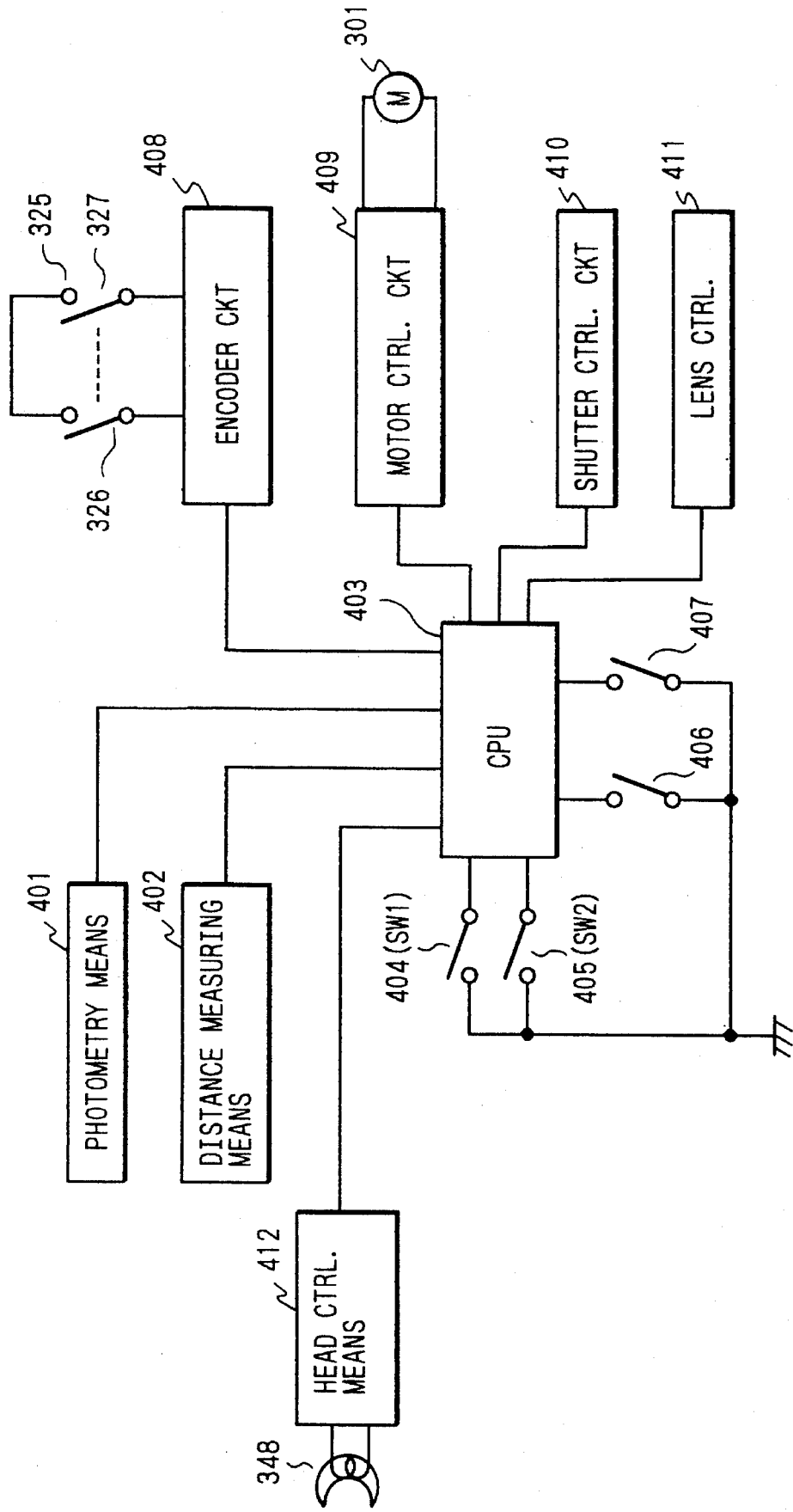
FIG. 9 is a camera circuit diagram of one of the other embodiments of the present invention.

FIG. 9 is a block diagram circuit of the embodiment hereof showing the construction of the circuit.

In FIG. 9, 401 is a photometry means to measure the brightness of the object to be photographed. 402 is a distance measuring means to measure the distance to the object to be photographed so that the focus of the camera lens can be adjusted. 403 is a micro-computer (to be referred to as just M/C hereinafter) and controls the functions of various circuits. 404 is a switch to be turned on in connection with the first stroke of the release button of the camera (not indicated in the figure), and is referred to as switch SW1-hereinafter. 405 is a switch to be turned on in connection with the second stroke of said release button and is referred to as switch SW2 hereinafter. 406 is a back plate switch in connection with the opening/closing of the back plate, and 407 is a cartridge loading identification switch to be activated depending on whether the film cartridge 333 is loaded into the cartridge chamber 335 or not.

408 is an encoder circuit to detect the pulse generated at the pulse plate 325 and the contractors 326 and 327 as shown in FIG. 21 and related figures, and is used as an information source to obtain the revolution speed and the revolution amount of the roller member 323 (the feeding amount of the film 334) and other data. 409 is a motor control means to control the revolution of said film feeding motor 301, and as aforesaid, the forward rotation of said motor 301 (in the arrow B direction in FIG. 22) performs film winding and the backward rotation (in the arrow C direction in FIG. 23) performs film rewinding. 410 is a shutter control means to control light exposure to the film. 411 is a lens control means, and based on the information from said distance measuring means, controls the lens cylinder so that the object to be photographed can be properly focused. 412 is a head control means to control the writing-in or reading-out of the information into or out from the unindicated magnetic memory part equipped in the film 334 by means of the magnetic head 348 shown in FIG. 21 and other figures.

FIGS. 10-1 and 10-2 are flow charts showing the functions of said M/C 403, and the functions of the circuits in FIG. 9 are described hereinafter in accordance with the flow charts thereof.

"Step 501": This step judges from the state of the back plate switch 406 whether the back plate of the camera is closed or not, and proceeds to Step 502 if it is judged closed.

"Step 502": This step judges from the cartridge loading identification switch 407 whether the film cartridge 333 is loaded into the cartridge chamber 335 or not, and proceeds to Step 503 if it is judged loaded.

"Step 503": Since the film cartridge 333 is judged loaded, this step sends a winding start signal to the motor control means 409 as well as starts counting the winding time using the inside timer thereof. As a result, the film driving motor 301 rotates in the arrow B direction as shown in FIG. 22, and causes the film 334 to start being pushed-out from the film cartridge through the gear arrangements as aforesaid.

"Step 504": The pulse signal equivalent to the rotation of the roller member 323 is input into this step from the encoder circuit 408, and the rotation velocity of the roller member 323 and the acceleration dv/dt are obtained upon the calculation with the clock signal inside thereof.

Where the number of pulse signals counted within a set time duration is N:v∝N, and dv/dt∝dN/dt.

Where the time interval between two consecutive pulse signal generated is T:v∝l/T, and dv/dt∝d(l/T)/dt.

"Step 505": This step judges whether the rotation velocity of the roller member 323 obtained in the above Step 504 varies suddenly or not, and if it is judged varying suddenly, this step proceeds to Step 600 in that the film 334 is judged to have been wound onto the film winding spool 307.

The reason why the sudden variation in the speed of the roller member 323 can be used to judge that the film 334 has been wound onto the winding spool 307 are as follows.

The relation between the feeding speed of the film 334 and the rotation speed of the roller member 323 is shown in FIG. 11.

In FIG. 11, the film winding (pushing-out) starts at the time $T_0$ from the loading of the film cartridge 333. A thinner solid line shows the rotation speed of the roller member 323, and a broken line shows the moving speed of the film tip driven by the fork at the time of pushing-out. There are actually slight variations in the speed existing due to load variations, but can be totally neglected and thus are not represented in the figure.

From the time $T_0$ to the time $T_1$ represents the duration of the film pushing-out. To absorb the loosened part of the film 334 inside the film cartridge 333, a lag ($T_1'$) is caused at the start-up. From the time $T_1'$ to the Time $T_1$ represents the actual durations of the film 334 being pushed-out by the fork 320, and the rotation speed of said fork determines the film feeding speeding during the duration thereof. During the duration thereof, the roller member 323 rotates at the speed determined by the rotation of the film driving motor 301 and the gearing ratio of the driving force relaying gear arrangements up to said roller member 323.

At the time $T_1$, the film tip reaches the roller member 323, and thereafter, the film 324 is pushed-out in conformity with the rotation speed of the roller member 323 until the film tip reaches the winding spool 307. At that time, as aforementioned, the film pushing-out driving by the fork 320 becomes invalid.

From the times $T_1$ to $T_2$, the film tip is fed to the winding spool 307, and at the time $T_2$, the film 334 is supposed to have been wound onto the winding spool; 307. Namely, a sudden variation in the speed of the roller member 323 means that the film 334 has been wound onto the winding spool 307 and has started to rotate at the speed in conformity with said spool 307. Thereafter, the winding of the film is done in conformity with the speed of said film winding spool 307 until the film reaches the specified position (until the first frame reaches the aperture part). At the same time, the driving force of the roller member 323 also becomes invalid.

When the first frame reaches the specified position, the film winding is made to stop by the motor control means 409, and at the time $T_3$, the film winding spool 307 also comes to halt. When the first frame is photographed, the film winding starts toward the second frame from the time $T_4$ on.

If the rotation speed of the roller member 323 does not show any sudden variation under this Step 505, Step 505 proceeds to Step 506.

"Step 506": This step judges whether the rotation velocity v of the roller member 323 is almost "0" or not. If it is "0", it judges that the film tip must have been stuck somewhere and that the motor 301 must have stopped rotating where neither the fork 320 nor the roller member 323 must be rotating. Thus, Step 506 returns Step 503 through the automatic loading failure sequence following Step 508, so that the film pushing-out driving is retried. If Step 506 confirms the rotation of the roller member 323, Step 506 proceeds to Step 507.

"Step 507": This step judges whether the set time ta has elapsed from the start of the film winding or not, and returns to Step 504 if it is judged not elapsed. If an increase in the rotation speed of the roller member 323 as a result of the film having been wound onto the winding spool 307 is not detected even after the expiration of the set time ta, this step proceeds to Step 508. Said set time ta is slightly longer than the interval between the times $T_0$ and $T_2$. In other words, the time ta is expected to be enough to cover from the start-up of the film pushing-out to the winding of the film onto the film winding spool 307. Namely, if it takes longer than the set time ta, it can be considered as an automatic loading failure.

"Step 508": This step starts the timer to count to set time tb. This set time tb is slightly longer than the interval between the times $T_0$ and $T_1$ in FIG. 11, provided that the winding speed is the same as the rewinding speed.

"Step 603": At this step, the film 334 once starts to be wound into the cartridge 333 so that the film winding (pushing-out) can be retried. Namely, the film rewinding is started through the motor control means 409.

"Step 604": Pulse signals are input from the encoder circuit 408, and the rotation speed v of the roller member 323 at the time of film rewinding is calculated.

"Step 605": This step judges whether the rotation speed v obtain in above Step 604 is greater than "0" or not, and proceeds to Step 608 if it is greater than "0" (meaning that the automatic loading of the film must have been failed between the roller member 323 and the film winding spool 307), and proceeds to Step 606 if it is "0" (meaning that the automatic loading of the film must have been failed somewhere up to the stage reaching the roller member 323 (for example, at the pushing-out of the film leader portion from the film cartridge).

"Step 606": This step judges whether the timer started in said Step 508 has counted the set time tb or not, and returns to Step 604 if it has not counted yet, and proceeds to Step 607 if it has counted already in assuming that up to the tip of the film 334 has been wound into the film cartridge 333.

"Step 607": This step stops the film rewinding through the motor control means 409.

If the rotation speed v of the roller member 323 is judged greater than "0" in above Step 605, as aforesaid, it is considered that the tip of the film 343 must have passed the position of the roller member 323 and forwarded to the spool chamber where the winding onto the film winding spool 307 must have been failed. In that case, this Step 607 proceeds to Step 608.

"Step 608": Again, pulse signals are input from the encoder circuit 408, and the rotation v of the roller member 323 is calculated.

"Step 609": This step judges whether the rotation speed v obtained in above Step 608 is "0" or not, and returns to Step 608 if it is not "0". If it is "0", this step judges that the film tip has passed the position of the roller member 323, and thus proceeds to Step 607 and immediately stops the film rewinding. In the way thereof, the film rewinding comes to halt before the film tip is wound into the film cartridge 333. Namely, the movement of the film 334 has come to halt at the state where the pushing-out of the film leader portion from the cartridge was successful.

If the rotation speed of the roller member 323 varies suddenly in above Step 505 (in the state at the time $T_2$ in FIG. 11), Step 505 proceeds to Step 600 as aforesaid.

"Step 600": This step drives the magnetic head 348 through the head control means 412 to start reading such information as the number of the specified frames of the film and the film sensitivity, both of which are imprinted in the magnetic memory part of the film 334.

"Step 509": This step has the encoder circuit 608 detecting the value of the pulse to be detected.

"Step 510": Using the counted contents of the above encoder circuit 408, this step judges whether the first frame has reached the aperture portion or not, and repeats Steps 509 and 510 until the first frame reaches said portion. If it judges the first frame has reached the aperture portion, Step 510 proceeds to Step 511.

"Step 511": This step stops the driving of the film driving motor 301 through the motor control means 409 and stops the film rewinding.

If the functions thereof complete, the flow proceeds to Step 512 in FIG. 10-2.

"Step 512": This step judges whether switch SW1 is turned on or not as a result of the first stroke of the release button having been done. If said switch SW1 is judged turned on, Step 512 proceeds to Step 513.

"Step 513": This step drives the photometry means 401 to measure the brightness of the object to be photographed (to obtain photometry information).

"Step 514": This step drives the distance measuring means 402 to calculate information on the distance to the object to be photographed (distance measurement information).

"Step 515": This step judges whether the release switch SW2 is turned on or not as a result of the second stroke of the release button having been done. If said release switch SW2 is judged turned on, Step 515 proceeds to Step 517, and if it is judged turned off, Step 515 proceeds to Step 516.

"Step 516": Like Step 512, this step judges whether switch SW1 is turned on or not, and returns to Step 512 if it is judged turned off, and returns to Step 515 to wait for the turning-on of the release switch SW2 if it is judged remaining turned on.

"Step 517": Based on the distance measurement information obtained in above Step 514, this step drives the lens control means 411 to have the camera lens moved to where it can be properly focused.

"Step 518": Based on the photometry information, this step drives the shutter control means 410 to control light exposure to the film 334.

"Step 519": This step starts the film winding through the monitor control means 409 and the film driving motor 301 so that the following frame can be located to the aperture portion.

"Step 520": Pulse signals are input from the encoder circuit 408, and the rotation speed v and the rotation amount (film feeding amount) of the roller member 323 are calculated.

"Step 521": This step judges whether the rotation speed of the roller member 323 obtained in above Step 520 is almost "0" or not, and proceeds to Step 522 if it is not "0" meaning that the film winding is still being done.

"Step 522": This step judges whether the encoder circuit 408 has counted the number of the counts equivalent to one frame feeding or not, and proceeds to Step 601 if it has not counted.

"Step 601": Based on pulse signals from the encoder circuit 408, this step determines an imprinting frequency to imprint information into the photographed frame (details are to be mentioned hereinafter).

"Step 602": In accordance with the above imprinting frequency, this step, through the head control means 412, has the magnetic head 348 imprinting information into the magnetic memory part of the film 334 being fed.

If the encoder circuit 408 is judged to have counted the number of the counts equivalent to one frame feeding in above Step 522, Step 522 proceeds to Step 523.

"Step 523": This step stops the driving of the film driving motor 301 through the motor control means 409 and stops the film winding. Then, this step returns to Step 512 to provide for the following frame to be photographed.

If the rotation speed of the roller member 323 is almost "0" in above Step 521, Step 521 proceeds to Step 524 in assuming that the film must have reached the end and been stretched as a result of the all frames having been photographed.

"Step 524": This step stops the driving of the film driving motor 301 through the motor control circuit means 409 and stops the winding.

"Step 525": This step drives the film driving motor 301 in the arrow C direction in FIG. 23 so that the rewinding of the film (winding into the film cartridge 333) can be started.

"Step 526": Pulse signals are input from the encoder circuit 408 and the rotation speed v of the roller member 323 is calculated.

"Step 527": This step judges whether the absolute value of the rotation speed v of the roller member 323 obtained in above Step 526 is greater than "0" or not, and if it is judged almost "0", Step 527 returns to above Step 526 to recalculate the rotation speed v of the roller member 323. If Step 527 thereafter detects v has become greater than "0", meaning that the rotation of the roller member 323 has been detected, Step 527 proceeds to Step 528.

The reason why the judgment flow of above Step 527 is provided is to distinguish the completion of the rewinding from a delay in the transition of the movement of the film 334 when there is a loosened portion existing at the film 334 wound onto the winding spool 307 by the first rewinding.

"Step 528": Pulse signals are input from the encoder circuit 408 and the rotation speed v of the roller member 323 is calculated.

"Step 529": This step judges whether the rotation speed v of the roller member 323 obtained in above Step 228 is "0" or not, and returns to Step 528 if it is not "0". If the rotation speed v of the roller member 323 is judged "0" thereafter, meaning that said roller member 323 has stopped rotating, this step judges that the film tip has passed the position of the roller member 323, and proceeds to Step 530.

"Step 530": This step starts the timer to count the set time tc.

"Step 531": Upon the confirmation of the expiration of the specified time tc, this step stops the film rewinding.

"Step 532": By the activation of the cartridge loading identification switch 407, this step judges whether the film cartridge 333 has been removed from the cartridge chamber 335 or not, and returns to Step 501 in FIG. 10-1.

FIG. 12 is a graph showing a solid line representing the rotation speed v of the roller member 323 at the time of film rewinding. At the time $T_5$, the rewinding has started and at the time $T_5$, the film tip has passed the position of the roller member 323. In the case of the film rewinding direction, the roller member 323 comes to stop immediately in that the frictional force between the roller member 323 and the facing part exceeds the driving force of the roller member 323. The broken line represents the moving speed of the film tip where the interval between the time $T_6$ and $T_7$ corresponds to the set time tc in above Step 530.

Figure 13:
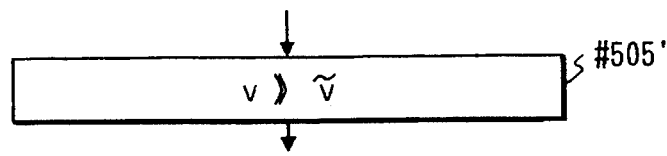
FIGS. 13 and 14 show flow charts where

In above FIG. 10-1, Step 505 judges whether the automatic loading has been successful or not by confirming a sudden variation in the speed (the magnitude of the acceleration). FIG. 13 is a modified example where the judgment is made by the magnitude of the present speed against the average speed.

Figure 14:
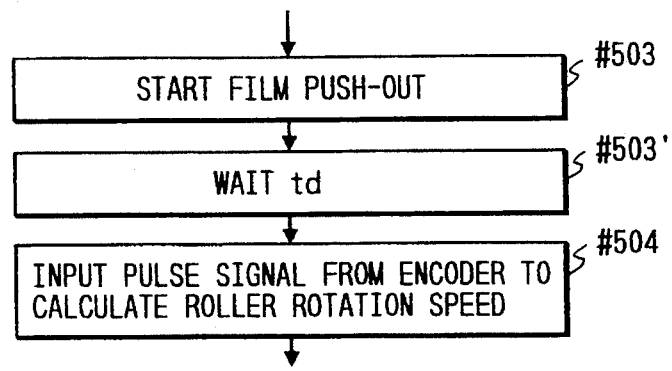

FIG. 14 shows one of the other examples where Step 503' is provided between Step 503 and Step 504 in FIG. 10-1. Only during the set time tb in which period the driving of the film driving motor 301 may get stabilized, the output of the encoder 408 is not referred to so that a misjudgment due to a variation in the acceleration or the speed at the start-up of the film driving motor 301 can be prevented.

Figure 15:
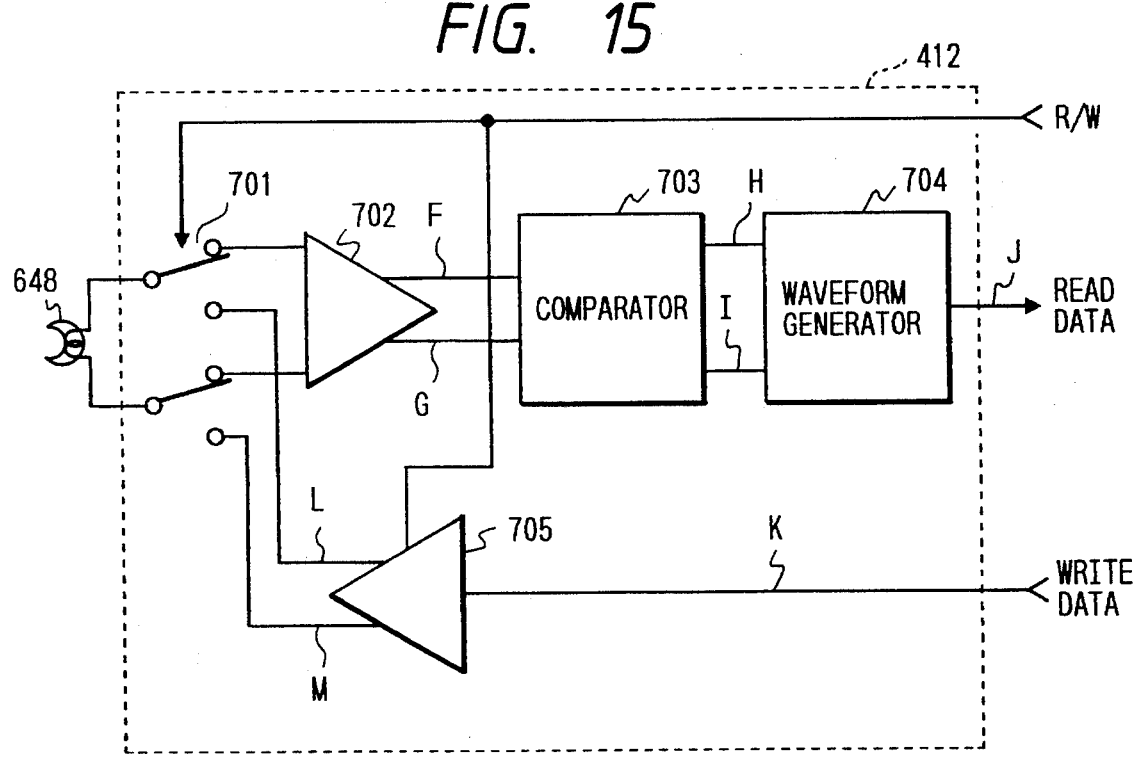
FIG. 15 is a circuit diagram showing an example of a specific construction of the head control circuit as indicated in FIG. 9.

FIG. 15 is a circuit diagram showing an example of a detailed construction of the head control means 412 indicated in FIG. 9.

Figure 16:
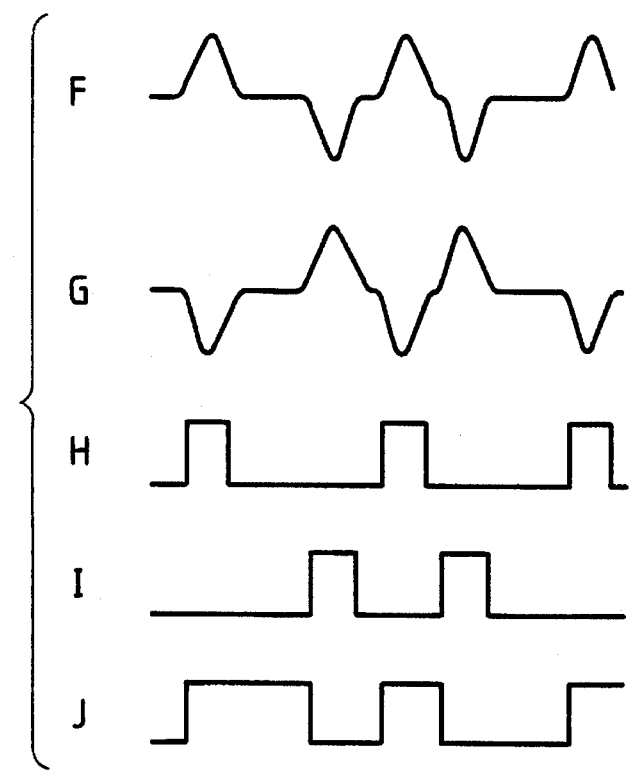
FIGS. 16 and 17 show the output wave forms of each portion of FIG. 15.

In FIG. 15, 701 is a switching means connecting the magnetic head 348 with either the information reading circuit system or the information write circuit system, and is controlled by the R/W signal. This R/W signal is sent from M/C 403 and is at a high level at the time of information reading. 702 is a differential amplifier for information writing which uses voltages generated at the magnetic head 348 as differential inputs and in turn, outputs respectively amplified signals such as F and G indicated in FIG. 16. 703 consists of a comparator equipped with a hysteresis, function inputting said signals F and G and generating digital signals such as H and I as outputs indicated in FIG. 16. 704 is a waveform generator circuit that wave forms the output signals H and I from the comparator 703 into the signal wave as represented by J in FIG. 16, which is output to M/C 403 as the read data. 705 is a driver circuit for information writing and transforms the write data (signal K) from M/C 403 into a write current for the magnetic head 348.

Figure 17:
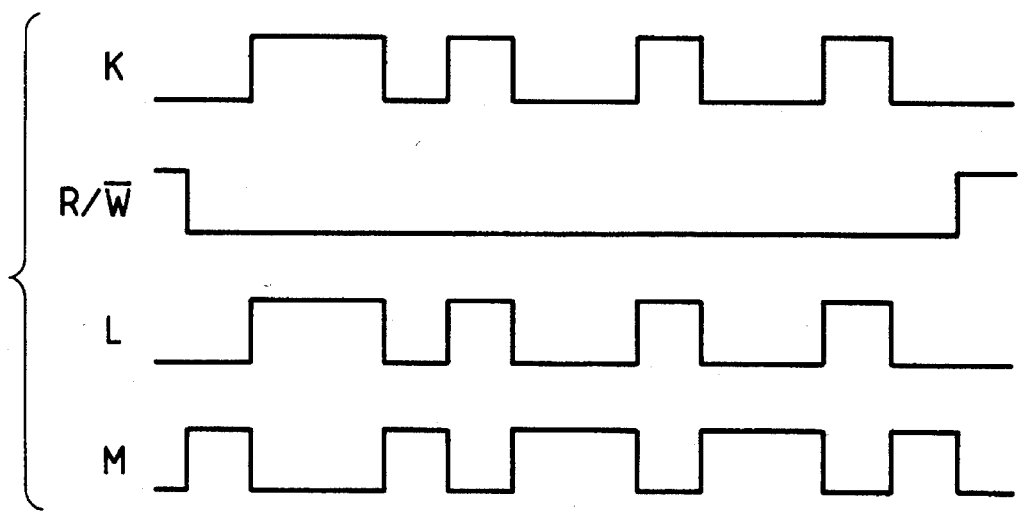

FIG. 17 shows the output signals L and M from the driver 705 against the write data (signal K) and R/W signal controlling the switching means 701.

Figure 18:
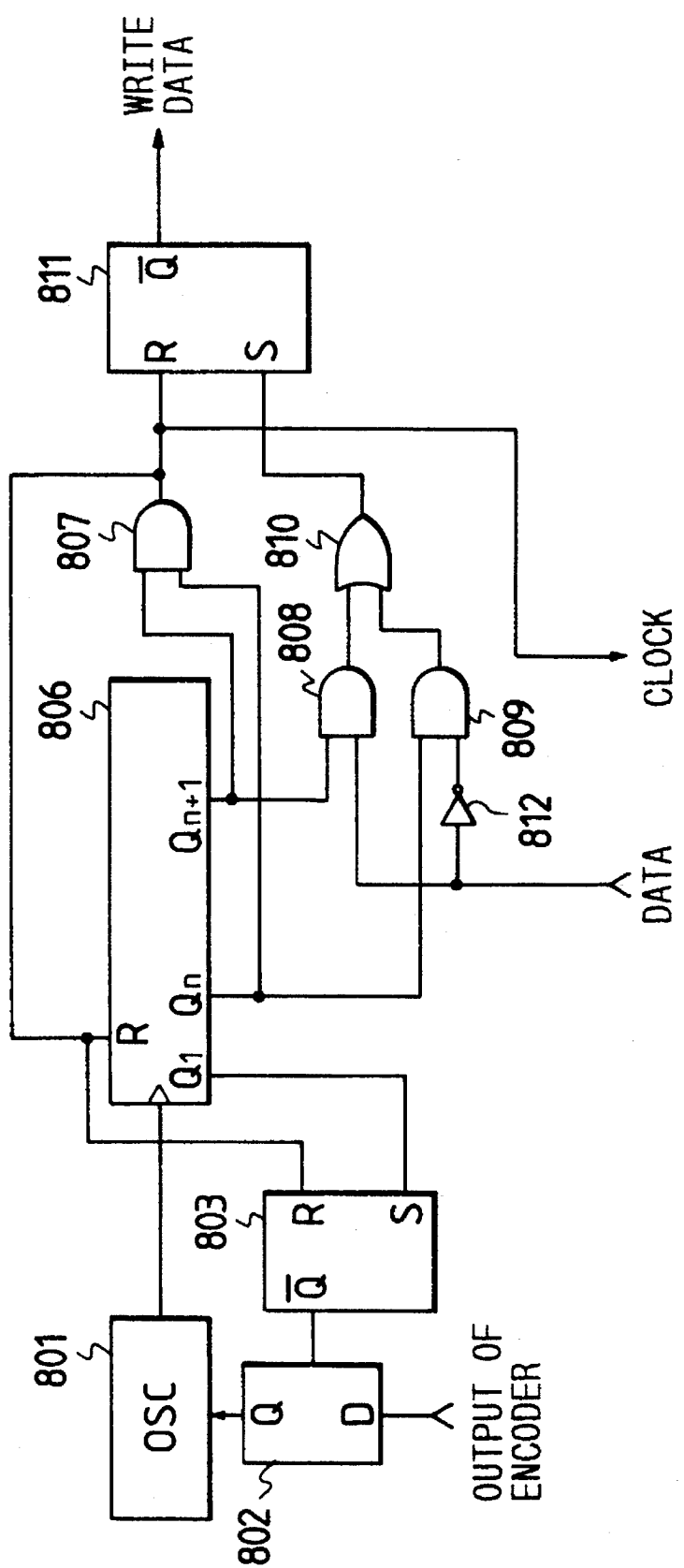
FIG. 18 shows a circuit diagram of a construction of the hardware for the processing of the write-in frequency determination to be done in the microcomputer as indicated in FIG. 9.

FIG. 18 is a circuit diagram used to explain, in a view point of hardware, the determination method of the imprinting frequency determined in said Step 401 in FIG. 10-2.

In FIG. 18, 801 is an oscillator determining the imprinting frequency where the frequency is controlled by the output of the latch 802.

An information recording method hereof is of a self-clocking type. When the signal K is used for explanation, the start-up edge is the clock signal showing the boundary of information. Namely, the start-down edge is the data signal. If the pulse width in high level is less than ½ of one cycle between two consecutive clock signals, a logic 1 is produced, and if that is greater than ½, a logic "0" is produced. Thus the signal K in FIG. 17 shows that for example, chronological write data consisting of "0111" was input.

A latch 802 samples the timing of the signal latch 803 that has processed the output from the encoder circuit 408. Namely, it lasts from when the resetting signal of the AND gate 807 is output, until the output terminal $Q_1$ of the counter becomes high level. Actually, as soon as the resetting signal is started up, it is latched. This is because the resetting signal is synchronized with the start-up of the clock signal at one cycle of the write signal, and because changing the frequency during one cycle can possibly give errors to the data signal if the imprinting frequency is higher than the synchronization of the output from the encoder circuit 408.

The counter 806 counts the pulse of the oscillator 801. The logic product of the output terminals $Q_n$ and $Q_{n+1}$ of said counter 806 is output from the AND gate 807, which is used as a clock to put forward the addresses of RAM, for example, of the write information, and used as the resetting signal for the latch 811. Also, it becomes the start-up edge of the write data of the latch 811. The start-down edge selects either the AND gate 808 or 809 depending on whether the data, for example, of RAM is in high level or low level, so that the timing for the output terminals $Q_n$ and $Q_{n+1}$ is selected respectively. Then, the latch 811 is set through the OR gate 810, controlling the position of the start-down edge. If the logic product of the output terminals $Q_n$ and $Q_{n+1}$ is "1", the width of $Q_n$ is ⅓ and that of $Q_{n+1}$ ⅔.

Figure 19B:
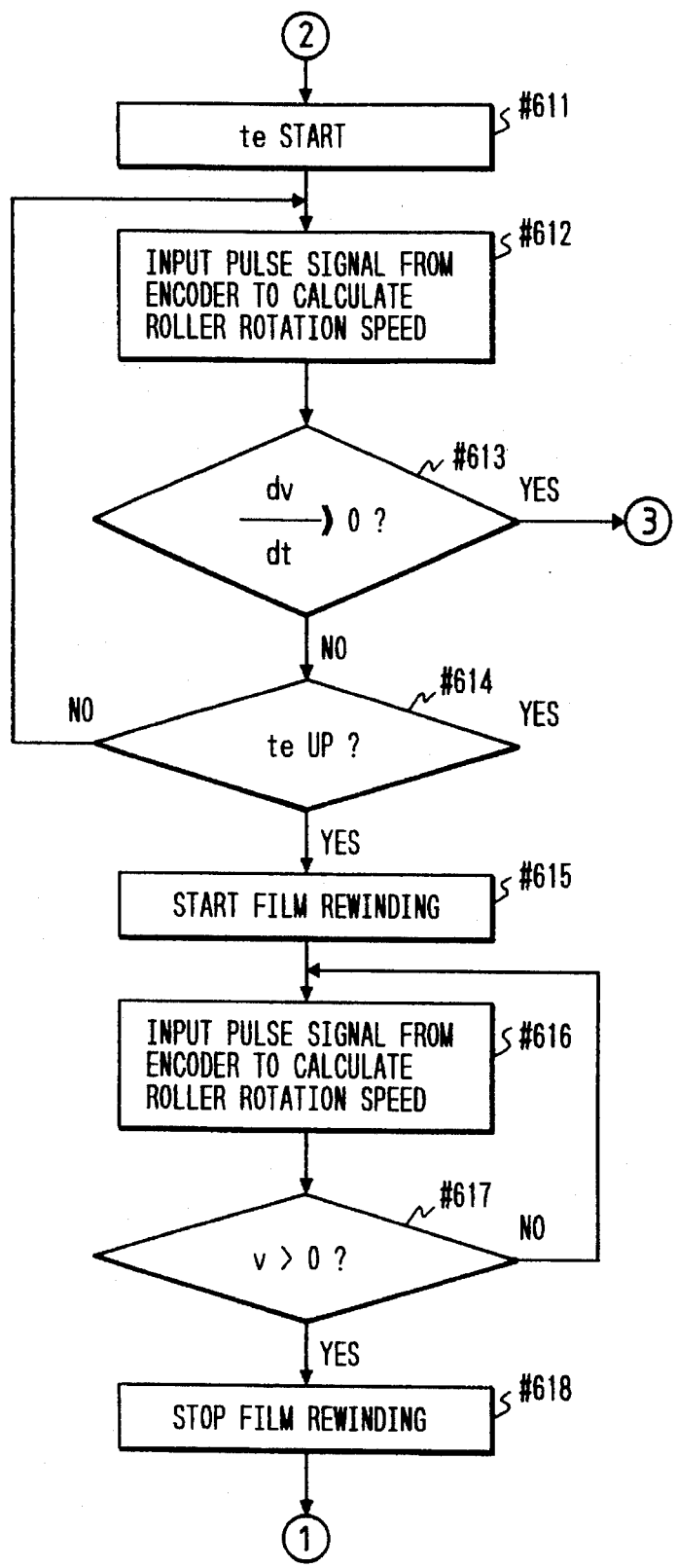
FIG. 19 shows an example of the other functions of the circuit of FIG. 9.

FIG. 19 is a flow chart showing one of the other functions of M/C 403 of the embodiment. In the embodiment thereof, as the film feeding gear arrangements, not a set of a fork/roller member/film winding spool as shown in FIG. 21 which are separately driven (referred to as FRS driving system hereinafter), S but a set of a fork/film winding spool which are driven (which is usually referred to as FS driving system) is supposed to be used. Namely, such construction is supposed to be used that the driving force from the film driving motor 301 in FIG. 21 is not relayed to the roller member 323.

FIG. 20 shows the speed to the roller member and the film tip, corresponding to said FIG. 11, provided that said construction is supposed to be used.

When the winding (pushing-out) of the film is started at $T_0$, the film tip starts moving in waiting for the delay in the time $T_1'$. It is not until the film tip reaches the position of the roller member 323 at the time $T_1$, from the start-up of the pushing-out that the rotation speed v of the roller member is detected. When the film 334 is wound onto the film winding spool 307 at the time $T_2$, the rotation speed v thereof is also increased.

In using the flow chart in FIG. 19, the functions of the circuit in FIG. 9 will be described hereinafter. For those parts that perform the same functions as of FIG. 10-1, the same step numbers are put to simplify the description.

"Step 505": This step judges whether the rotation speed v of the roller member 323 is "0" or not, namely whether the roller member 323 has started to turn or not. Upon the confirmation of the rotation of said roller member 323, the film -tip is pushed-out from the inside of the film cartridge 333. Then, Step 606 judges that the film tip has reached the position of the roller member 323 (assuming that the film pushing-out was successful), and thus proceeds to Step 611.

"Step 611": This step starts the specified time te timer. The set te equals to the interval between the time $T_1$ and $T_2$ in FIG. 20, namely a time duration which can sufficiently cover from when the film tip has passed the position of the roller member 323, until wound onto the film winding spool 307.

"Step 612": Pulse signals are input from the encoder circuit 408 and the acceleration dv/dt of the roller member 323 is calculated.

"Step 613": This step judges by dv/dt whether the speed obtained in above Step 612 has suddenly varied or not, and proceeds to the functions of Step 600 and the following steps as already explained, provided that a sudden variation has been determined, meaning that the automatic loading was successful. If any sudden variation cannot be determined, Step 613 proceeds to Step 614.

"Step 614": This step judges whether the counting of the set time te has been complete or not, and returns to Step 612 if it has not been complete. If it is judged complete, Step 614 proceeds to Step 615.

"Step 615": The film rewinding is made to start through the motor control circuit 409 and the film driving motor 301.

"Step 616": Pulse signals are input from the encoder circuit 408 and the rotation speed v of the roller member 323 is calculated.

"Step 617": This step judges whether the rotation speed v obtained in above Step 616 is "0" or not namely whether the film tip has passed the position of the roller member 323 or not, and returns to Step 616 to repeat the same function if the film tip has not passed the position of the roller member 323. If it is judged passed, Step 617 immediately proceeds to Step 618.

"Step 618": This step stops the film rewinding through the motor driving means 409 and the film driving motor 301, and returns to Step 503. As a result thereof, the winding of the film up to its tip into the cartridge 333 can be prevented after the pushing-out of the film leader portion from the cartridge was successful, so that the film tip comes to halt between the roller member 323 and the fork 320.

If Step 507 judges that the set time ta has elapsed, namely the automatic loading has failed without the film tip reaching the roller member 328, Step 507 proceeds to Step 610.

"Step 610": The film rewinding is done through the motor control means 409 and the film driving motor 301 during the set time tb which is slightly longer than the interval between $T_1$ and $T_0$ in FIG. 20. As a result, the film 334 including its tip is completely wound into the cartridge 333. Thereafter, Step 610 returns to Step 503 to retry the pushing-out of the film.

As described above, according to the embodiments aforementioned, a camera that can automatically repeat the blank feeding even if the first blank feeding fails, can be provided, and further according to the embodiments in FIGS. 1 through 8, a camera that can prevent an unsuccessful repeating of said blank feeding, can be provided.

Also, according to the embodiments in FIGS. 1 through 9, accidents such as a film becoming bent or stuck due to dust or sticky matters inside the film cartridge, can be prevented by first of all rewinding the film prior to the time of the blank feeding start-up in a camera utilizing a film cartridge which is so constructed that the film is fed out as a result of the revolution of a feed spoof inside the camera.

Further, according to the embodiments in FIGS. 1 through 9, a timer time for the first winding and a timer time used to determine a failure from the pushing-out to the blank feeding are best set based on the number of the specified frames of a film, so that quick functioning without wasting time or an alarm of a blank feeding failure can be made possible.

Further, according to the embodiments in FIGS. 9 through 33, a means to measure the moving speed of the film is provided around the aperture of a camera, so that in the case of an automatic loading failure, whether the pushing-out of the film from the film cartridge failed or the winding of film onto the winding spool failed even if the pushing-out succeeded, is judged by comparing the outputs from the means thereof with various set times, and so that in the case of a winding failure onto the film winding spool, the winding of the film is made to stop for the retrial of the film winding before up to the film tip becomes wound into the film cartridge. Thus, repeating the pushing-out of the film from the beginning can be eliminated once the pushing-out of the film from the cartridge succeeded, thereby avoiding another possible failure in the pushing-out of the film or a waste of time.

We claim:

1. A camera using a push-out type film cartridge, comprising:
    (A) film feeding means for driving a feed spool of the push-out type film cartridge to blank feed a film; and
    (B) control means, in case of a failure of the film blank feeding, for causing said film feeding means to rewind the film and retry the film blank feeding.

2. A camera according to claim 1, wherein said control means comprises means for repeatedly performing the rewinding and retrying operations a predetermined number of times and for, if the failure in the film blank feeding still cannot be corrected, preventing any further rewinding and retrying operations.

3. A camera according to claim 2, further comprising:
    alarm means for indicating the failure of the film blank feeding if the failure of the film blank feeding cannot be corrected even if the rewinding and blank feeding of the film have been repeated the predetermined number of times after the first failure of the film blank feeding.

4. A camera according to claim 1, further comprising:
    alarm means for indicating the failure of the film blank feeding if the failure of the film blank feeding cannot be corrected even if the rewinding and blank feeding of the film have been repeated the predetermined number of times after the failure of the film blank feeding.

5. A camera according to claim 1, wherein said control means comprises means for causing said film feeding means to rewind the film before the first film blank feeding to be done by said film feeding means.

6. A camera according to claim 1, wherein said control means further comprises time setting means for setting a time period for judging whether the film blank feeding is properly done, or for setting the time period for the rewinding of the film depending on the number of frames of the loaded film.

7. A camera according to claim 6, wherein said time setting means further comprises means for setting the maximum time as the time period if the number of frames of the loaded film is unknown.

8. A camera according to claim 1, wherein said control means further comprises adjusting means for varying the position of the film to be rewound by the rewinding operation depending on the position of the film fed by the film blank feeding in the case of a failure of the film blank feeding.

9. A camera according to claim 6, wherein said time setting means comprises means for shortening the time period if the number of frames of the loaded film is small.

10. A camera according to claim 8, wherein said adjusting means comprises detection means for detecting the fed position of the film based on the change of feed speed of the film during the film blank feeding operation.

11. A camera according to claim 8, wherein said adjusting means comprises detection means for detecting the fed position of the film based on the change of feed speed of the film during the rewinding operation.

12. A camera according to claim 8, wherein said adjusting means comprises means, when the film blank feeding operation fails and the fed position of the film exceeds a predetermined position, for unwinding the film until all of the film is outside of the film cartridge.

13. A camera according to claim 12, wherein said adjusting means comprises means, when the film blank feeding operation fails and the fed position of the film does not exceed a predetermined position, for rewinding the film until all of the film is contained in the film cartridge.

14. A camera according to claim 8, wherein said adjusting means comprises means, when the film blank feeding operation fails and the fed position of the film does not exceed a predetermined position, for rewinding the film until all of the film is contained in the film cartridge.

15. A camera according to claim 1, wherein said control means comprises means for repeatedly performing film rewinding and retrying film blank feeding a predetermined number of times after the failure of the film blank feeding operation and for causing said film feeding means to prevent, if the failure in film blank feeding cannot be corrected, further film blank feeding.

16. A camera according to claim 15, wherein said control means comprises means for repeatedly performing film rewinding and retrying film blank feeding a predetermined number of times after the failure of the film blank feeding and for causing said film feeding means to perform, if the failure in blank feeding cannot be corrected, further film rewinding.

17. A camera according to claim 15, further comprising: alarm means for indicating the failure of the film blank feeding if the failure of the film blank feeding cannot be corrected even if the rewinding and blank feeding of the film have been repeated the predetermined number of times after the first failure of the film blank feeding.

18. A camera according to claim 1, wherein said control means comprises means for judging the occurrence of film blank feeding on the basis of the change of speed of the film during the blank feeding.

19. A camera according to claim 1, wherein said control means includes means for judging the state of the film blank feed operation performed by said film feeding means, said judging means having means for suspending judgment during a predetermined time from the beginning of film blank feeding.

20. A camera using a push-out type film cartridge, comprising:
(a) film feeding means for driving a feed spool of the push-out type film cartridge to blank feed the film; and
(b) time setting means for setting a time period to judge whether the film blank feeding has been completed, the time period being set in accordance with the number of frames of the loaded film.

21. A camera according to claim 20, wherein said time setting means comprises means for setting the maximum time as the time period if the number of frames of the loaded film is unknown.

22. A camera according to claim 20, wherein said time setting means comprises means for shortening the time period if the number of frames of the loaded film is small.

23. A camera comprising:
(a) film feeding means for performing blank feeding of the film; and
(b) time setting means for setting a time period to judge whether the film blank feeding has been completed, the time period being set in accordance with the number of frames of the loaded film.

24. A camera according to claim 23, wherein said time setting means comprises means for setting the maximum time as the time period if the number of frames of the loaded film is unknown.

25. A camera according to claim 23, wherein said time setting means comprises means for shortening the time period if the number of frames of the loaded film is small.

26. A camera using a push-out type film cartridge, comprising:
(a) film feeding means for driving a feed spool of the push-out type film cartridge to blank feed the film;
(b) judging means for judging whether a spool drive for blank feeding is properly performed; and
(c) control means for automatically causing said film feeding means to rewind the film when said judging means judges that said blank feeding is not properly performed, said control means being maintained inoperative when said judging means judges that said blank feeding is properly performed.

27. A film feeding apparatus for a camera using a push-out type film cartridge, comprising:
(a) film feeding means for driving a feed spool of the push-out type film cartridge to blank feed a film; and
(b) control means, in case of a failure of the film blank feeding, for causing said film feeding means to rewind the film and retry the film blank feeding.

28. A film feeding apparatus for a camera according to claim 27, wherein said control means comprises means for repeatedly performing the rewinding and retrying operations a predetermined number of times and for, if the failure in the film blank feeding still cannot be corrected, preventing any further rewinding and retrying operations.

29. A film feeding apparatus for a camera according to claim 28, further comprising:
alarm means for indicating the failure of the film blank feeding if the failure of the film blank feeding cannot be corrected even if the rewinding and blank feeding of the film have been repeated the predetermined number of times after the first failure of the film blank feeding.

30. A film feeding apparatus for a camera according to claim 27, further comprising:
alarm means for indicating the failure of the film blank feeding if the failure of the film blank feeding cannot be corrected even if the rewinding and blank feeding of the film have been repeated the predetermined number of times after the failure of the film blank feeding.

31. A film feeding apparatus for a camera according to claim 27, wherein said control means comprises means for causing said film feeding means to rewind the film before the first film blank feeding to be done by said film feeding means.

32. A film feeding apparatus for a camera according to claim 27, wherein said control means further comprises time setting means for setting a time period for judging whether the film blank feeding is properly done, or for setting the time period for the rewinding of the film depending on the number of frames of the loaded film.

33. A film feeding apparatus for a camera according to claim 32, wherein said time setting means further comprises means for setting the maximum time as the time period if the number of frames of the loaded film is unknown.

34. A film feeding apparatus for a camera according to claim 27, wherein said control means further comprises adjusting means for varying the position of the film to be rewound by the rewinding operation depending on the position of the film fed by the film blank feeding in the case of a failure of the film blank feeding.

35. A film feeding apparatus for a camera according to claim 32, wherein said time setting means comprises means for shortening the time period if the number of frames of the loaded film is small.

36. A film feeding apparatus for a camera according to claim 34, wherein said adjusting means comprises detection means for detecting the fed position of the film based on the change of feed speed of the film during the film blank feeding operation.

37. A film feeding apparatus for a camera according to claim 34, wherein said adjusting means comprises detection means for detecting the fed position of the film based on the change of feed speed of the film during the rewinding operation.

38. A film feeding apparatus for a camera according to claim 34, wherein said adjusting means comprises means, when the film blank feeding operation fails and the fed position of the film exceeds a predetermined position, for unwinding the film until all of the film is outside of the film cartridge.

39. A film feeding apparatus for a camera according to claim 38, wherein said adjusting means comprises means, when the film blank feeding operation fails and the fed position of the film does not exceed a predetermined position, for rewinding the film until all of the film is contained in the film cartridge.

40. A film feeding apparatus for a camera according to claim 34, wherein said adjusting means comprises means, when the film blank feeding operation fails and the fed position of the film does not exceed a predetermined position, for rewinding the film until all of the film is contained in the film cartridge.

41. A film feeding apparatus for a camera according to claim 27, wherein said control means comprises means for repeatedly performing film rewinding and retrying film blank feeding a predetermined number of times after the failure of the film blank feeding operation and for causing said film feeding means to prevent, if the failure in film blank feeding cannot be corrected, further film blank feeding.

42. A film feeding apparatus for a camera according to claim 41, wherein said control means comprises means for repeatedly performing film rewinding and retrying film blank feeding a predetermined number of times after the failure of the film blank feeding and for causing said film feeding means to perform, if the failure in blank feeding cannot be corrected, further film rewinding.

43. A film feeding apparatus for a camera according to claim 41, further comprising:
alarm means for indicating the failure of the film blank feeding if the failure of the film blank feeding cannot be corrected even if the rewinding and blank feeding of the film have been repeated the predetermined number of times after the first failure of the film blank feeding.

44. A film feeding apparatus for a camera according to claim 27, wherein said control means comprises means for judging the occurrence of film blank feeding on the basis of the change of speed of the film during the blank feeding.

45. A film feeding apparatus for a camera according to claim 27, wherein said control means includes means for judging the state of the film blank feed operation performed by said film feeding means, said judging means having means for suspending judgment during a predetermined time from the beginning of film blank feeding.

46. A film feeding apparatus for a camera using a push-out type film cartridge, comprising:
(a) film feeding means for driving a feed spool of the push-out type film cartridge to blank feed the film; and
(b) time setting means for setting a time period to judge whether the film blank feeding has been completed, the time period being set in accordance with the number of frames of the loaded film.

47. A film feeding apparatus for a camera according to claim 46, wherein said time setting means comprises means for setting the maximum time as the time period if the number of frames of the loaded film is unknown.

48. A film feeding apparatus for a camera according to claim 46, wherein said time setting means comprises means for shortening the time period if the number of frames of the loaded film is small.

49. A film feeding apparatus for a camera, comprising:
(a) film feeding means for performing blank feeding of the film; and
(b) time setting means for setting a time period to judge whether the film blank feeding has been completed, the time period being set in accordance with the number of frames of the loaded film.

50. A film feeding apparatus for a camera according to claim 49, wherein said time setting means comprises means for setting the maximum time as the time period if the number of frames of the loaded film is unknown.

51. A film feeding apparatus for a camera according to claim 49, wherein said time setting means comprises means for shortening the time period if the number of frames of the loaded film is small.

52. A film feeding apparatus for a camera using a push-out type film cartridge, comprising:
(a) a film feeding means for driving a feed spool of the push-out type film cartridge to blank feed the film;
(b) judging means for judging whether a spool drive for blank feeding is properly performed; and
(c) control means for automatically causing said film feeding means to rewind the film when said judging means judges that said blank feeding is not properly performed, said control means being maintained inoperative when said judging means judges that said blank feeding is properly performed.

53. A camera using a push-out type film cartridge, comprising:
(a) film feeding means for driving a feed spool of the push-out type film cartridge to blank feed the film; and
(b) control means for causing said feeding means to perform the film rewinding operation prior to performing the film blank feeding, wherein a time period for the film rewinding operation performed by said control means is set in accordance with the number of frames of the loaded film.

54. A film feeding apparatus for a camera using a push-out type film cartridge, comprising:
(a) film feeding means for driving a feed spool of the push-out type film cartridge to blank feed a loaded film; and
(b) control means for causing said feeding means to perform a film rewinding operation prior to performing the film blank feeding, wherein a time period for the film rewinding operation performed by said control means is set in accordance with a number of frames of the loaded film.

55. A camera using a type of film cartridge wherein an entire film including the leader portion is initially contained in the cartridge and wherein the film is fed out of an outlet of the film cartridge by rotating a feed spool in a first direction and the film is collected into the film cartridge by rotating said feed spool in a second direction, said camera comprising:

(a) film feeding means for driving said feed spool; and (b) control means for blank feeding the film by rotating the feed spool in the first direction by said film feeding means when the entire film including the leader portion is contained within the film cartridge after rotating the feed spool in the second direction by said film feeding means.

56. A camera, comprising:

(a) film feeding means for driving a feed spool of a film cartridge to blank feed a film;

(b) judging means for judging whether a spool drive for blank feeding is properly performed; and (c) control means for automatically causing said film feeding means to rewind the film when said judging means judges that said blank feeding is not properly performed, said control means being maintained inoperative when said judging means judges that said blank feeding is properly performed.

57. A camera, comprising:

(a) film feeding means for driving a feed spool of a film cartridge to blank feed a film;

(b) judging means for judging whether a spool drive for blank feeding is properly performed; and (c) control means for automatically causing said film feeding means to rewind the film, and retrying said film blank feeding when said judging means judges that said blank feeding is not properly performed, said control means being maintained inoperative when said judging means judges that said blank feeding is properly performed.

58. A camera, comprising:

(a) blank feeding means for performing film blank feeding of a film;

(b) judging means for judging whether said film blank feeding by said blank feeding means is properly performed; and (c) control means for automatically rewinding the film when said judging means judges that said blank feeding is not properly performed.

* * * * *

UNITED STATES PATENT AND TRADEMARK OFFICE
CERTIFICATE OF CORRECTION

PATENT NO. : 5,521,667
DATED : May 28, 1996
INVENTOR(S) : AKIRA EGAWA, ET AL.

It is certified that error appears in the above-indentified patent and that said Letters Patent is hereby corrected as shown below:

Column 4

Line 6, "the;" should read --the--.

Column 10

Line 9, "pat" should read --part--.
Line 15, "arrow a" should read --arrow A--.
Line 21, "an" should read --a--.
Line 26, "out side" should read --outside--.

Column 11

Line 11, "planetary-gear" should read --planetary gear--.
Line 13, "becomes" should read --comes--.
Line 48, "becomes" should read --comes--.

Column 12

Line 51, "posse" should read --passes--.
Line 60, "direction" should read --detection--.

Column 13

Line 58, "head;" should read --head--.

UNITED STATES PATENT AND TRADEMARK OFFICE
CERTIFICATE OF CORRECTION

PATENT NO. : 5,521,667
DATED : May 28, 1996
INVENTOR(S) : AKIRA EGAWA, ET AL.

It is certified that error appears in the above-indentified patent and that said Letters Patent is hereby corrected as shown below:

<u>Column 14</u>

Line 15, "rotable" should read --rotatable--.
    Line 34, "SW1-" should read --SW1--.

<u>Column 15</u>

Line 61, "spool;" should read --spool--.

<u>Column 18</u>

Line 66, "Step 228" should read --Step 528--.

<u>Column 20</u>

Line 67, "-tip" should read --tip--.

<u>Column 21</u>

Line 65, "spoof" should read --spool--.

Signed and Sealed this

First Day of October, 1996

Attest:

BRUCE LEHMAN

Attesting Officer      Commissioner of Patents and Trademarks